US012573397B2

(12) United States Patent
Choi et al.

(10) Patent No.: US 12,573,397 B2
(45) Date of Patent: Mar. 10, 2026

(54) ELECTRONIC APPARATUS AND CONTROLLING METHOD THEREOF

(71) Applicant: Samsung Electronics Co., Ltd., Suwon-si (KR)

(72) Inventors: Wonjong Choi, Suwon-si (KR); Manun Jeong, Suwon-si (KR); Cheolseung Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 56 days.

(21) Appl. No.: 18/461,095

(22) Filed: Sep. 5, 2023

(65) Prior Publication Data

US 2024/0161746 A1      May 16, 2024

Related U.S. Application Data

(63) Continuation of application No. PCT/KR2023/009946, filed on Jul. 12, 2023.

(30) Foreign Application Priority Data

Nov. 11, 2022     (KR) ........................ 10-2022-0150713
Dec. 13, 2022     (KR) ........................ 10-2022-0174201

(51) Int. Cl.
*G10L 15/22*          (2006.01)
*G10L 15/04*          (2013.01)

(52) U.S. Cl.
CPC .............. *G10L 15/22* (2013.01); *G10L 15/04* (2013.01); *G10L 2015/223* (2013.01)

(58) Field of Classification Search
CPC ... G10L 15/22; G10L 15/04; G10L 2015/223; G10L 15/083; G10L 2015/088
See application file for complete search history.

(56) References Cited

U.S. PATENT DOCUMENTS 6,851,116 B1     2/2005   Yoshikawa
9,318,108 B2     4/2016   Gruber et al.
(Continued)

FOREIGN PATENT DOCUMENTS

CN          109688036 B     12/2021
JP          2000-307594 A    11/2000
(Continued)

OTHER PUBLICATIONS

International Search Report dated Oct. 20, 2023, issued in International Application No. PCT/KR2023/009946.
(Continued)

*Primary Examiner* — Richemond Dorvil
(74) *Attorney, Agent, or Firm* — Jefferson IP Law, LLP

(57)          ABSTRACT

A main device is provided. The main device includes a memory storing function information and importance information of each function of a first sub-device, a communication interface connected to the first sub-device, and at least one processor configured to acquire the function information and importance information of each function of a second sub-device, determine whether at least one function performed by the first sub-device exists among a plurality of functions performed by the second sub-device, determine a device to perform the at least one function based on importance of the at least one function of the second sub-device and importance of the at least one function of the first sub-device, and transmit information on the device to perform the at least one function to the first sub-device and the second sub-device.

18 Claims, 29 Drawing Sheets

(56) References Cited

U.S. PATENT DOCUMENTS

| | | | |
|---|---|---|---|
| 9,842,490 B2 | 12/2017 | Shin et al. | |
| 9,997,158 B2 | 6/2018 | Chen et al. | |
| 10,510,342 B2 | 12/2019 | Lee et al. | |
| 11,133,007 B2* | 9/2021 | Choi | G01C 21/3608 |
| 11,170,778 B2 | 11/2021 | Jun | |
| 11,347,445 B2 | 5/2022 | Tokuchi | |
| 11,361,765 B2 | 6/2022 | Park | |
| 11,398,230 B2* | 7/2022 | Jang | G06F 3/0485 |
| 11,437,024 B2 | 9/2022 | Kim | |
| 11,443,744 B2* | 9/2022 | Kang | G10L 15/083 |
| 11,501,770 B2* | 11/2022 | Chun | G10L 15/22 |
| 11,804,224 B2* | 10/2023 | Kwon | G10L 17/12 |
| 11,893,310 B2* | 2/2024 | Borja Jaramillo | G10L 13/04 |
| 12,183,338 B2* | 12/2024 | Kim | G10L 15/22 |
| 2011/0161084 A1* | 6/2011 | Lin | G10L 15/08 |
| | | | 704/252 |
| 2014/0070925 A1 | 3/2014 | Shin et al. | |
| 2016/0011910 A1* | 1/2016 | Kang | G06F 9/5044 |
| | | | 718/104 |
| 2020/0117515 A1 | 4/2020 | Kang | |
| 2020/0202870 A1* | 6/2020 | Sekine | G10L 15/22 |
| 2020/0219482 A1 | 7/2020 | Kim et al. | |
| 2020/0357394 A1* | 11/2020 | Choi | G10L 15/22 |
| 2021/0152389 A1* | 5/2021 | Park | G06V 10/764 |
| 2022/0100464 A1 | 3/2022 | Prakash et al. | |
| 2022/0148556 A1* | 5/2022 | Kwiatkowska | G10L 15/16 |
| 2022/0224437 A1 | 7/2022 | Lee | |
| 2022/0358925 A1* | 11/2022 | Park | G10L 15/22 |

FOREIGN PATENT DOCUMENTS

| | | | |
|---|---|---|---|
| KR | 10-2016-0008399 A | 1/2016 | |
| KR | 10-2081273 B1 | 2/2020 | |
| KR | 10-2020-0126960 A | 11/2020 | |
| KR | 10-2021-0051259 A | 5/2021 | |
| KR | 10-2022-0064056 A | 5/2022 | |

OTHER PUBLICATIONS

Extended European Search Report dated Jul. 25, 2025; European Appln. No. 23888845.7-1218 / 4521396 PCT/KR2023009946.

* cited by examiner

FIG. 8

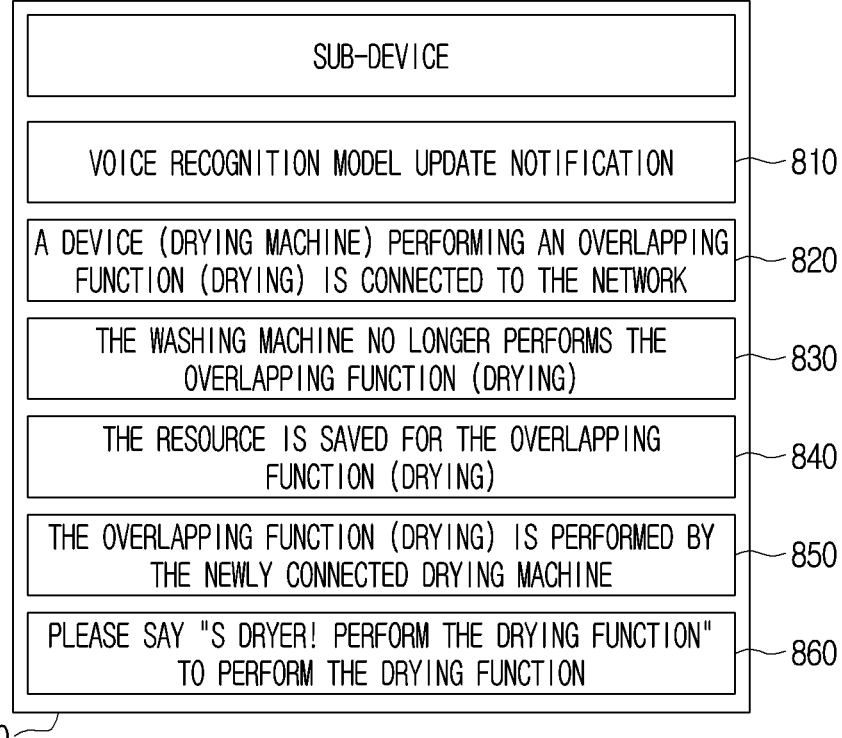

SUB-DEVICE

VOICE RECOGNITION MODEL UPDATE NOTIFICATION — 810

A DEVICE (DRYING MACHINE) PERFORMING AN OVERLAPPING FUNCTION (DRYING) IS CONNECTED TO THE NETWORK — 820

THE WASHING MACHINE NO LONGER PERFORMS THE OVERLAPPING FUNCTION (DRYING) — 830

THE RESOURCE IS SAVED FOR THE OVERLAPPING FUNCTION (DRYING) — 840

THE OVERLAPPING FUNCTION (DRYING) IS PERFORMED BY THE NEWLY CONNECTED DRYING MACHINE — 850

PLEASE SAY "S DRYER! PERFORM THE DRYING FUNCTION" TO PERFORM THE DRYING FUNCTION — 860

| FIRST DEVICE(DRYING MACHINE, #01) ||
|---|---|
| FUNCTION | IMPORTANCE |
| DRYING(f3) | 0.9 |
| DUST REMOVAL(f4) | 0.6 |

1510

| SECOND DEVICE(WASHING MACHINE, #02) ||
|---|---|
| FUNCTION | IMPORTANCE |
| WASHING(f1) | 0.9 |
| STERILIZATION(f2) | 0.5 |

1520

| THIRD DEVICE(AIR DRESSER, #03) ||
|---|---|
| FUNCTION | IMPORTANCE |
| DUST REMOVAL(f4) | 0.8 |
| DEODORIZATION(f5) | 0.7 |
| STERILIZATION(f2) | 0.6 |

| FIRST FUNCTION(WASHING, f1) | |
|---|---|
| DEVICE | IMPORTANCE |
| WASHING MACHINE(#02) | 0.7 |
| – | – |

1610

| SECOND FUNCTION(STERILIZATION, f2) | |
|---|---|
| DEVICE | IMPORTANCE |
| AIR DRESSER(#03) | 0.6 |
| WASHING MACHINE(#02) | 0.5 |

1620

| THIRD FUNCTION(DRYING, f3) | |
|---|---|
| DEVICE | IMPORTANCE |
| DRYING MACHINE(#01) | 0.9 |
| – | – |

1630

| FOURTH FUNCTION(DUST REMOVAL, f4) | |
|---|---|
| DEVICE | IMPORTANCE |
| AIR DRESSER(#03) | 0.8 |
| DRYING MACHINE(#01) | 0.6 |

1640

| FIFTH FUNCTION(DEODORIZATION, f5) | |
|---|---|
| DEVICE | IMPORTANCE |
| AIR DRESSER(#03) | 0.7 |
| – | – |

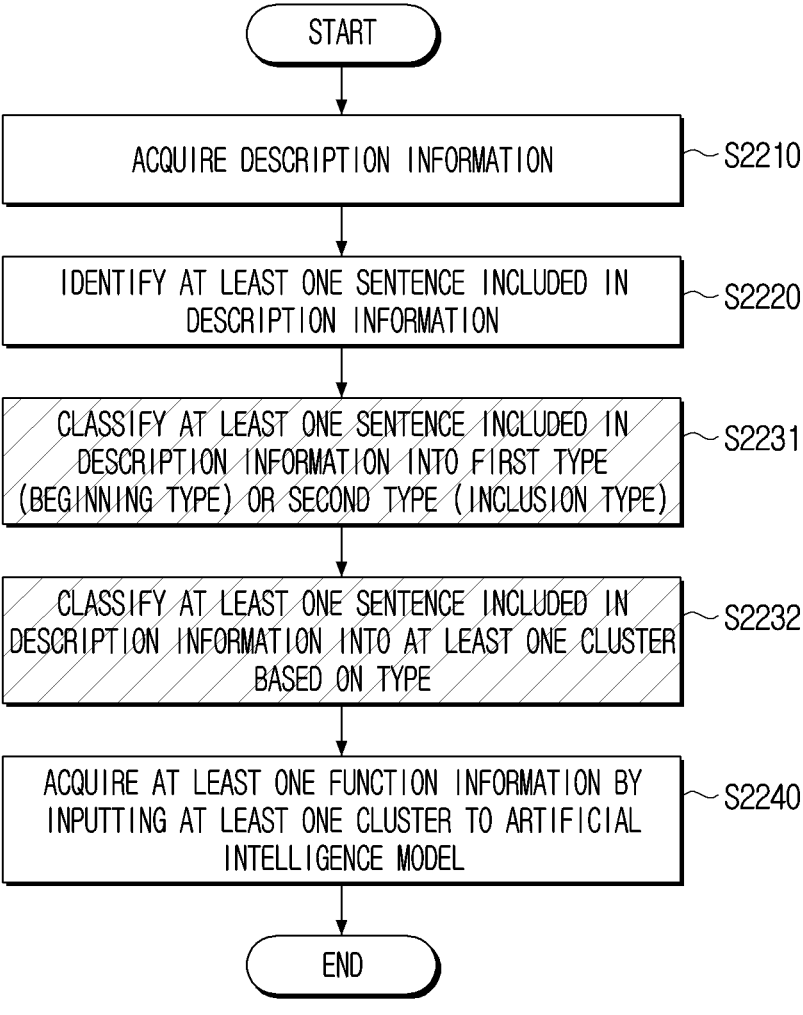

START

ACQUIRE DESCRIPTION INFORMATION — S2210

IDENTIFY AT LEAST ONE SENTENCE INCLUDED IN DESCRIPTION INFORMATION — S2220

CLASSIFY AT LEAST ONE SENTENCE INCLUDED IN DESCRIPTION INFORMATION INTO FIRST TYPE (BEGINNING TYPE) OR SECOND TYPE (INCLUSION TYPE) — S2231

CLASSIFY AT LEAST ONE SENTENCE INCLUDED IN DESCRIPTION INFORMATION INTO AT LEAST ONE CLUSTER BASED ON TYPE — S2232

ACQUIRE AT LEAST ONE FUNCTION INFORMATION BY INPUTTING AT LEAST ONE CLUSTER TO ARTIFICIAL INTELLIGENCE MODEL — S2240

END

FIG. 25

(1) DIRT MAY BE EFFECTIVELY REMOVED FROM THE CLOTHES
(2) A FINE DUST FILTER HAS BEEN APPLIED TO THE PRODUCT FOR THE
FIRST TIME IN KOREA, AND THE FILTER MAY THUS COLLECT DUST SEPARATED
FROM THE CLOTHES (OR COLLECTS DUST OR TRASH IN ONE PLACE)
(3) AN ODOR[u6] DECOMPOSITION FILTER HAS BEEN APPLIED TO THE
PRODUCT FOR THE FIRST TIME IN KOREA, AND THE FILTER MAY THUS
DECOMPOSE NOT ONLY TOBACCO ODOR PARTICLES BUT ALSO MEAT ODOR
PARTICLES, AND PREVENT RE-ADSORPTION (RE-ADHERING) OF THE ODOR
PARTICLES
(4) VIRUSES AND GERMS ON THE CLOTHES MAY BE STERILIZED THROUGH
STEAM

DESCRIPTION INFORMATION

2510

(1) DIRT MAY BE EFFECTIVELY REMOVED FROM THE CLOTHES

BEGINNING (B)

(2) A FINE DUST FILTER HAS BEEN APPLIED TO THE PRODUCT FOR THE
FIRST TIME IN KOREA, AND THE FILTER MAY THUS COLLECT DUST
SEPARATED FROM THE CLOTHES (OR COLLECTS DUST OR TRASH IN ONE PLACE)

INCLUSION (I)

(3) AN ODOR DECOMPOSITION FILTER HAS BEEN APPLIED TO THE PRODUCT
FOR THE FIRST TIME IN KOREA, AND THE FILTER MAY THUS DECOMPOSE
NOT ONLY TOBACCO ODOR PARTICLES BUT ALSO MEAT ODOR PARTICLES,
AND PREVENT RE-ADSORPTION (RE-ADHERING) OF THE ODOR PARTICLES

BEGINNING (B)

(4) VIRUSES AND GERMS ON THE CLOTHES MAY BE STERILIZED THROUGH
STEAM

BEGINNING (B)

2520

(1) DIRT MAY BE EFFECTIVELY REMOVED FROM THE CLOTHES
(2) A FINE DUST FILTER HAS BEEN APPLIED TO THE PRODUCT FOR THE
FIRST TIME IN KOREA, AND THE FILTER MAY THUS COLLECT DUST SEPARATED
FROM THE CLOTHES (OR COLLECTS DUST OR TRASH IN ONE PLACE)

FIRST CLUSTER (3) AN ODOR DECOMPOSITION FILTER HAS BEEN APPLIED TO THE PRODUCT
FOR THE FIRST TIME IN KOREA, AND THE FILTER MAY THUS DECOMPOSE NOT
ONLY TOBACCO ODOR PARTICLES BUT ALSO MEAT ODOR PARTICLES, AND
PREVENT RE-ADSORPTION (RE-ADHERING) OF THE ODOR PARTICLES

SECOND CLUSTER (4) VIRUSES AND GERMS ON THE CLOTHES MAY BE STERILIZED THROUGH
STEAM

THIRD CLUSTER

Figure 26:
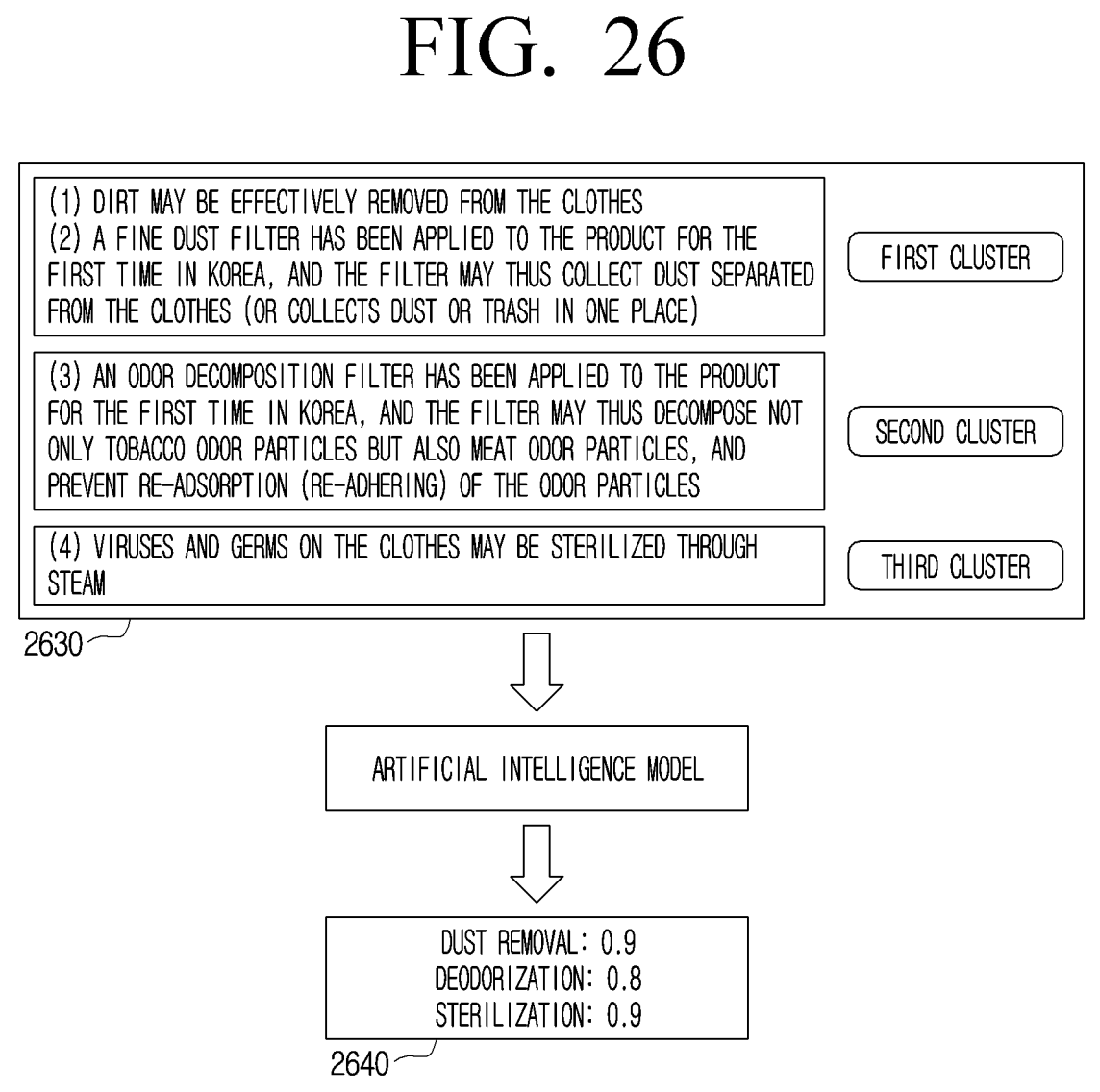

(1) DIRT MAY BE EFFECTIVELY REMOVED FROM THE CLOTHES
(2) A FINE DUST FILTER HAS BEEN APPLIED TO THE PRODUCT FOR THE FIRST TIME IN KOREA, AND THE FILTER MAY THUS COLLECT DUST SEPARATED FROM THE CLOTHES (OR COLLECTS DUST OR TRASH IN ONE PLACE)

FIRST CLUSTER (3) AN ODOR DECOMPOSITION FILTER HAS BEEN APPLIED TO THE PRODUCT FOR THE FIRST TIME IN KOREA, AND THE FILTER MAY THUS DECOMPOSE NOT ONLY TOBACCO ODOR PARTICLES BUT ALSO MEAT ODOR PARTICLES, AND PREVENT RE-ADSORPTION (RE-ADHERING) OF THE ODOR PARTICLES

SECOND CLUSTER (4) VIRUSES AND GERMS ON THE CLOTHES MAY BE STERILIZED THROUGH STEAM

THIRD CLUSTER

2630

ARTIFICIAL INTELLIGENCE MODEL

DUST REMOVAL: 0.9
DEODORIZATION: 0.8
STERILIZATION: 0.9

2640

2800

ELECTRONIC APPARATUS AND CONTROLLING METHOD THEREOF

CROSS-REFERENCE TO RELATED APPLICATION(S)

This application is a continuation application, claiming priority under § 365(c), of an International application No. PCT/KR2023/009946, filed on Jul. 12, 2023, which is based on and claims the benefit of a Korean patent application number 10-2022-0150713, filed on Nov. 11, 2022, in the Korean Intellectual Property Office, and of a Korean patent application number 10-2022-0174201, filed on Dec. 13, 2022, in the Korean Intellectual Property Office, the disclosure of each of which is incorporated by reference herein in its entirety.

BACKGROUND

1. Field

The disclosure relates to an electronic apparatus and a controlling method thereof. More particularly, the disclosure relates to an electronic apparatus which may control a voice recognition model performed on each of a plurality of devices, and a controlling method thereof.

2. Description of the Related Art

Each of a plurality of devices may perform a voice recognition function in a network in which the plurality of devices exist. Each of the plurality of devices may have a function that the corresponding device may perform, and perform a corresponding function based on a user command.

However, some of the functions that may be performed by the plurality of devices may overlap each other. For example, a washing machine may also perform a drying function, and a drying machine may also perform the drying function.

Each device may perform the plurality of functions rather than performing one function, and one device may thus require many resources to process all of the plurality of functions. The device may have a slower processing speed in case that the resources are allocated to each of the plurality of functions.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic apparatus (main device) which may control one device to perform each overlapping function of the plurality of devices, and a controlling method thereof.

Additional aspects will be set forth in part in the description which follows and, in part, will be apparent from the description, or may be learned by practice of the presented embodiments.

In accordance with an aspect of the disclosure, a main device is provided. The main device includes a memory configured to store function information and importance information of each function of a first sub-device, a communication interface connected to the first sub-device, and at least one processor configured to acquire the function information and importance information of each function of a second sub-device in case that the second sub-device is connected to the main device, determine whether at least one function performed by the first sub-device exists among a plurality of functions performed by the second sub-device based on the stored function information of the first sub-device and the stored function information of the second sub-device, determine a device to perform the at least one function based on importance of the at least one function of the second sub-device and importance of the at least one function of the first sub-device in case of determining that the at least one function performed by the first sub-device exists among the plurality of functions performed by the second sub-device, and transmit information on the device to perform the at least one function to the first sub-device and the second sub-device through the communication interface, and in case that the device to perform the at least one function is determined as the second sub-device, the first sub-device reallocates a voice recognition segmentation model stored in the first sub-device for each function based on information on a remaining function except for the at least one function among the plurality of functions performed by the first sub-device and a resource of the first sub-device.

In case that the device to perform the at least one function is determined as the second sub-device, the second sub-device may allocate a voice recognition segmentation model stored in the second sub-device for each function based on information on at least one function including the at least one function among the plurality of functions performed by the second sub-device and a resource of the second sub-device.

The at least one processor may be further configured to determine the target device to perform the at least one function, and transmit result information including information indicating that at least one function is performed by the target device to the first sub-device and the second sub-device through the communication interface.

The at least one processor may be further configured to determine the device to perform each of the plurality of functions based on the importance of the plurality of functions of the second sub-device and the importance of the plurality of functions of the first sub-device in case of determining that the plurality of functions performed by the first sub-device exist among the plurality of functions performed by the second sub-device.

The at least one processor may be further configured to determine a device to perform a first function among the plurality of functions as the first sub-device, determine a device to perform a second function among the plurality of functions as the second sub-device, and transmit result information including information indicating that the first function is performed by the first sub-device and information indicating that the second function is performed by the second sub-device to the first sub-device and the second sub-device through the communication interface.

The at least one processor may be further configured to acquire description information of the second sub-device in case that the second sub-device is connected to the main device, and acquire the function information and importance information of each function of the second sub-device based on the description information of the second sub-device.

The at least one processor may be further configured to identify a main function and an auxiliary function based on the description information of the second sub-device, and acquire importance of the main function and importance of the auxiliary function, the importance of the main function having a larger value than the importance of the auxiliary function.

The at least one processor may be further configured to acquire the function information and importance information of each function of the second sub-device by analyzing at least one sentence included in the description information of the second sub-device.

The at least one processor may be further configured to acquire the description information of the second sub-device among the plurality of description information stored in the memory in case that the second sub-device is connected to the main device.

The at least one processor may be further configured to request the description information of the second sub-device from an external server through the communication interface in case that the description information of the second sub-device is not identified among the plurality of description information stored in the memory, and receive the description information of the second sub-device from the external server through the communication interface.

In accordance with another aspect of the disclosure, a controlling method of a main device which stores the function information and importance information of each function of a first sub-device, and is connected to the first sub-device is provided. The controlling method includes acquiring the function information and importance information of each function of a second sub-device in case that the second sub-device is connected to the main device, determining whether at least one function performed by the first sub-device exists among a plurality of functions performed by the second sub-device based on the stored function information of the first sub-device and the function information of the second sub-device, determining a device to perform the at least one function based on importance of the at least one function of the second sub-device and importance of the at least one function of the first sub-device in case that the at least one function performed by the first sub-device is determined to exist among the plurality of functions performed by the second sub-device, and transmitting information on the device to perform the at least one function to the first sub-device and the second sub-device, wherein in case that the device to perform the at least one function is determined as the second sub-device, the first sub-device may reallocate a voice recognition segmentation model stored in the first sub-device for each function based on information on a remaining function except for the at least one function among the plurality of functions performed by the first sub-device and a resource of the first sub-device.

In case that the device to perform the at least one function is determined as the second sub-device, the second sub-device may allocate a voice recognition segmentation model stored in the second sub-device for each function based on information on at least one function including the at least one function among the plurality of functions performed by the second sub-device and a resource of the second sub-device.

The determining of the device may include determining the target device to perform the at least one function, and the transmitting of the information may include transmitting result information including information indicating that at least one function is performed by the target device may be transmitted to the first sub-device and the second sub-device.

The determining of the device may include determining the device to perform each of the plurality of functions based on the importance of the plurality of functions of the second sub-device and the importance of the plurality of functions of the first sub-device in case that the plurality of functions performed by the first sub-device are determined to exist among the plurality of functions performed by the second sub-device.

The determining of the device may include determining a device to perform a first function among the plurality of functions may be determined as the first sub-device, and a device to perform a second function among the plurality of functions may be determined as the second sub-device, and the transmitting of the information may include transmitting result information including information indicating that the first function is performed by the first sub-device and information indicating that the second function is performed by the second sub-device may be transmitted to the first sub-device and the second sub-device.

In the acquiring, description information of the second sub-device may be acquired in case that the second sub-device is connected to the main device, and the function information and importance information of each function of the second sub-device may be acquired based on the description information of the second sub-device.

In the acquiring, a main function and an auxiliary function may be identified based on the description information of the second sub-device, and importance of the main function and importance of the auxiliary function may be acquired, the importance of the main function having a larger value than the importance of the auxiliary function.

In the acquiring, the function information and importance information of each function of the second sub-device may be acquired by analyzing at least one sentence included in the description information of the second sub-device.

In the acquiring, the description information of the second sub-device among the plurality of description information stored in the main device may be acquired in case that the second sub-device is connected to the main device.

In the acquiring, a request for description information of the second sub-device may be transmitted to an external server in case that the description information of the second sub-device is not identified among the plurality of description information stored in the main device, and description information of the second sub-device may be acquired from the external server.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8 is a view for explaining a screen displayed on a sub-device according to an embodiment of the disclosure;

FIG. 15 is a view for explaining the function and importance of each of a plurality of devices according to an embodiment of the disclosure;

FIG. 16 is a view for explaining a plurality of devices for each function and their importance according to an embodiment of the disclosure;

FIG. 22 is a flowchart for explaining an operation of classifying a sentence included in the description information into a cluster according to an embodiment of the disclosure;

FIG. 25 is a view for explaining an operation of classifying a sentence included in the description information into a cluster according to an embodiment of the disclosure;

FIG. 26 is a view for explaining an operation of acquiring function information based on a cluster according to an embodiment of the disclosure;

The same reference numerals are used to represent the same elements throughout the drawings.

DETAILED DESCRIPTION

Figure 1:
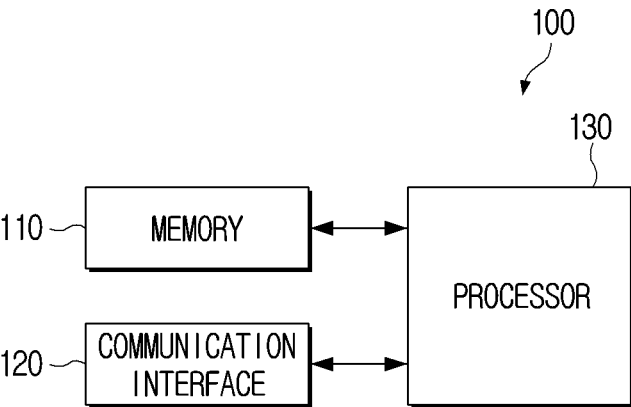
FIG. 1 is a block diagram showing a main device according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the specification, an expression "have," "may have," "include," "may include," or the like, indicates the existence of a corresponding feature (for example, a numerical value, a function, an operation, or a component such as a part), and does not exclude the existence of an additional feature.

An expression, "at least one of A or/and B" may indicate either "A or B", or "both of A and B."

Expressions "first," "second," or the like, used in the specification may qualify various components regardless of a sequence or importance of the components. These expressions are used only to distinguish one component from another component, and do not limit the corresponding components.

In case that any component (e.g., a first component) is mentioned to be "(operatively or communicatively) coupled with/to" or "connected to" another component (e.g., a second component), it is to be understood that any component may be directly coupled to another component or may be coupled to another component through still another component (e.g., a third component).

It is to be understood that a term "include," "formed of," or the like used in this application specifies the existence of features, numerals, steps, operations, components, parts, or combinations thereof, which is mentioned in the specification, and does not preclude the existence or addition of one or more other features, numerals, steps, operations, components, parts, or combinations thereof.

In the disclosure, a "module" or a "~er/~or" may perform at least one function or operation, may be implemented by hardware or software, or be implemented by a combination of hardware and software. In addition, a plurality of "modules" or a plurality of "~ers/~ors" may be integrated in at least one module to be implemented by at least one processor (not shown) except for a "module" or a "~er/or" that needs to be implemented by a specific hardware.

In the specification, such a term as a "user" may refer to a person who uses an electronic apparatus or an apparatus (for example, an artificial intelligence electronic apparatus) which uses the electronic apparatus.

Hereinafter, one or more embodiments of the disclosure are described in detail with reference to the accompanying drawings.

FIG. 1 is a block diagram showing a main device 100 according to an embodiment of the disclosure.

The main device 100 may include, for example, at least one of a smartphone, a tablet personal computer (PC), a mobile phone, a video phone, an e-book reader, a desktop PC, a laptop PC, a netbook computer, a workstation, a server, and a personal digital assistant (PDA), a portable multimedia player (PMP), a moving picture experts group audio layer-3 (MP3) player, a medical device, a camera, or a wearable device. The wearable device may include at least one of an accessory type (for example, a watch, a ring, a bracelet, an anklet, a necklace, a glasses, a contact lens, or a head-mounted-device (HMD)), a textile or clothing integral type (for example, an electronic clothing), a body attachment type (for example, a skin pad or a tattoo), or a living body implantation type circuit. In some embodiments, the main device 100 may include, for example, at least one of a television, a digital video disk (DVD) player, an audio player, a refrigerator, an air conditioner, a vacuum cleaner, an oven, a microwave oven, a washing machine, an air purifier, a set-top box, a home automation control panel, a security control panel, a media box (e.g., Samsung Home-Sync™, Apple TV™ or Google TV™), a game console (e.g., Xbox™ or PlayStation™), an electronic dictionary, an electronic key, a camcorder, or an electronic picture frame.

The main device 100 may include a memory 110, a communication interface 120, and at least one processor 130.

The memory 110 may store the function information and importance information of each function of a first sub-device 210.

The communication interface 120 may be connected to the first sub-device 210. A connected state may indicate a state where a communication session is established.

The main device 100, the first sub-device 210, and a second sub-device 220 may be devices included in one network. Each device may be a device included in one internet of things (IoT) network. The main device 100 may be a host device managing the network among the plurality of devices. The main device 100 may be a management device exchanging information with the plurality of devices included in the network. A sub-device 200 including the first sub-device 210 and the second sub-device 220 may be a device exchanging information with the main device 100.

At least one processor 130 may acquire the function information and importance information of each function of the second sub-device 220 in case that the second sub-device 220 is connected to the main device 100, determine whether at least one function performed by the first sub-device 210 exists among a plurality of functions performed by the second sub-device 220 based on the stored function information of the first sub-device 210 and the stored function information of the second sub-device 220, determine a device (or target device) to perform at least one function based on importance of at least one function of the second sub-device 220 and importance of at least one function of the first sub-device 210 in case of determining that at least one function performed by the first sub-device 210 exists among the plurality of functions performed by the second sub-device 220, and transmit information on the device to perform at least one function to the first sub-device 210 and the second sub-device 220 through the communication interface 120.

At least one processor 130 may receive a connection request from the second sub-device 220 in a state where the main device 100 is connected to the first sub-device 210. In case of receiving the connection request from the second sub-device 220, at least one processor 130 may determine whether to permit the connection request from the second sub-device 220.

In case that the second sub-device 220 and the main device 100 are connected to each other, at least one processor 130 may acquire the function information and importance information of each function of the second sub-device 220.

At least one processor 130 may acquire identification information of the second sub-device 220 from the second sub-device 220. At least one processor 130 may acquire the function information and importance information of each function of the second sub-device 220 based on the identification information of the second sub-device 220.

According to various embodiments, the main device 100 may store the function information corresponding to each of the plurality of identification information in the memory 110. In addition, the main device 100 may store the importance information of each function corresponding to each of the plurality of identification information in the memory 110.

In case of acquiring the identification information of the second sub-device 220, at least one processor 130 may acquire the function information corresponding to the identification information of the second sub-device 220 among the information stored in the memory 110.

In case of acquiring the identification information of the second sub-device 220, at least one processor 130 may acquire the importance information of each function corresponding to the identification information of the second sub-device 220 among the information stored in the memory 110.

The function information may include at least one function that may be performed by the device. The importance information of each function may indicate the importance of a specific function in the device. The higher importance included in the importance information of each function, the greater the importance of the function in the device. The function information and the importance information of each function may be acquired by a function information and importance information acquisition module 133 of FIG. 6.

At least one processor 130 may compare a function that may be performed by the first sub-device 210 with a function that may be performed by the second sub-device 220. At least one processor 130 may determine whether at least one function included in the function information of the first sub-device 210 and at least one function included in the function information of the second sub-device 220 overlap each other.

At least one function performed by the first sub-device 210 among the plurality of functions performed by the second sub-device 220 may be described as an overlapping function (or at least one overlapping function).

In case that the overlapping function exists, at least one processor 130 may determine which device has the overlapping function as a more important function. A determination criterion may be the importance. At least one processor 130 may determine which device is to perform the overlapping function by comparing the importance information of each function of the first sub-device 210 with the importance information of each function of the second sub-device 220.

In case of identifying the overlapping function, at least one processor 130 may determine that the overlapping function is performed by one device. The reason is to avoid wasting a resource. At least one processor 130 may determine a device with higher importance as the target device to perform the overlapping function.

In case of determining the target device to perform the overlapping function, at least one processor 130 may generate result information including identification information on the overlapping function and the target device to perform the overlapping function. The result information may be described as overlapping function information or comparison result information.

It may be assumed that the overlapping function of the first sub-device 210 and the second sub-device 220 is performed by the second sub-device 220. At least one processor 130 may determine the second sub-device 220 as the target device.

At least one processor 130 may determine the second sub-device 220 as the target device in case that importance of the overlapping function of the second sub-device 220 is greater than importance of the overlapping function of the first sub-device 210.

At least one processor 130 may control the first sub-device 210 to no longer perform the overlapping function. In case that the overlapping function is not performed by the first sub-device 210, remaining functions of the first sub-device 210 may be allocated to more segmentation models, thus improving performance of the remaining functions. In addition, a resource used by the first sub-device 210 may be saved. In addition, the first sub-device 210 may have an increased data processing speed.

In case that the device to perform at least one function is determined as the second sub-device 220, the first sub-device 210 may reallocate a voice recognition segmentation model stored in the first sub-device 210 for each function based on information on the remaining function except for at least one function among the plurality of functions performed by the first sub-device 210 and the resource of the first sub-device 210.

In case that the device to perform at least one function is determined as the second sub-device 220, the second sub-device 220 may allocate a voice recognition segmentation model stored in the second sub-device 220 for each function based on information on at least one function including at least one function among the plurality of functions performed by the second sub-device 220 and a resource of the second sub-device 220.

The first sub-device 210 and the second sub-device 220 may each include a separate voice recognition model. The voice recognition model may include the plurality of voice recognition segmentation models. The segmentation model may be described as a detailed model or a sub-model. The voice recognition model may include the plurality of segmentation models, and the plurality of segmentation models may be allocated for each function that may be performed by the device.

For example, it may be assumed that the voice recognition model includes 10 segmentation models. It may also be assumed that the device where the voice recognition model is stored may perform two functions. The device may allocate 10 segmentation models for each function based on a predetermined criterion (e.g., importance). It may be assumed that the two functions are a first function and a second function. In addition, it may be assumed that importance (0.7) of the first function of the device is greater than importance (0.3) of the second function. The device may allocate 7 segmentation models among 10 segmentation models to the first function and 3 segmentation models to the second function.

A criterion for allocating the functions and the segmentation models may be the resource of each device. The resource may indicate capacity of a unit of data that may be simultaneously processed by the device. The device may allocate the plurality of segmentation models for each function based on the resource.

In case that a new device, i.e., second sub-device 220, is connected to the main device 100, and the overlapping function is identified, at least one processor 130 may transmit the result information on the overlapping function to the first sub-device 210 and the second sub-device 220.

In case that receiving the result information on the overlapping function, the first sub-device 210 and the second sub-device 220 may each reallocate the plurality of segmentation models for each function. In a state where the segmentation model is already allocated, the first sub-device 210 and the second sub-device 220 may each reallocate the segmentation model based on the result information on the overlapping function. The segmentation model of the first sub-device 210 may be already allocated for each function before the connection of the second sub-device 220, and an allocation operation after the connection of the second sub-device 220 may thus be described as a reallocation operation.

At least one processor 130 may determine the target device to perform at least one function (or the overlapping function), and transmit result information including information indicating that at least one function is performed by the target device to the first sub-device 210 and the second sub-device 220 through the communication interface 120.

The target device may be a device with the higher importance in performing the overlapping function. At least one processor 130 may compare first importance of the overlapping function of the first sub-device 210 and second importance of the overlapping function of the second sub-device 220. At least one processor 130 may determine a device having a larger value among the first importance and the second importance as the target device. In addition, at least one processor 130 may transmit result information on a determination operation to the first sub-device 210.

At least one processor 130 may determine the device to perform each of the plurality of functions based on the importance of the plurality of functions of the second sub-device and the importance of the plurality of functions of the first sub-device in case of determining that the plurality of functions performed by the first sub-device 210 exist among the plurality of functions performed by the second sub-device 220.

A plurality of overlapping functions may exist. It may be assumed that the plurality of overlapping functions are the first function and the second function.

At least one processor 130 may compare importance of the first function of the first sub-device 210 with importance of the first function of the second sub-device 220. At least one processor 130 may determine a device with higher importance for the first function as a target device to perform the first function.

At least one processor 130 may compare importance of the second function of the first sub-device 210 with importance of the second function of the second sub-device 220. At least one processor 130 may determine a device with higher importance for the second function as a target device to perform the second function.

It may be assumed that the first sub-device 210 has a higher importance for the first function than the second sub-device 220.

It may be assumed that the second sub-device 220 has a higher importance for the second function than the first sub-device 210.

The at least one processor 130 may determine the device to perform the first function among the plurality of functions as the first sub-device 210, determine the device to perform the second function among the plurality of functions as the second sub-device 220, and transmit result information including information indicating that the first function is performed by the first sub-device 210 and information indicating that the second function is performed by the second sub-device 220 to the first sub-device 210 and the second sub-device 220 through the communication interface 120.

The result information may include information on both the first function and the second function. In case that the plurality of overlapping functions exist, the result information may include all information on each of the plurality of functions. For example, the result information may include information indicating that the first sub-device 210 performs the first function and information indicating that the second sub-device 220 performs the second function.

The at least one processor 130 may acquire description information of the second sub-device 220 in case that the second sub-device 220 is connected to the main device 100, and acquire the function information and importance information of each function of the second sub-device 220 based on the description information of the second sub-device 220.

A description of an operation of acquiring the function information based on the description information is provided below with reference to FIGS. 24 to 27.

The at least one processor 130 may identify a main function and an auxiliary function based on the description information of the second sub-device 220, and acquire importance of the main function and importance of the auxiliary function, the importance of the main function having a larger value than the importance of the auxiliary function.

A criterion determining the main function and the auxiliary function may be the number of words included in the description information. At least one processor 130 may compare the number of words representing the first function and the number of words representing the second function.

In case that the number of words representing the first function is greater than the number of words representing the second function, at least one processor 130 may determine that the first function is a more important function than the second function. In detail, at least one processor 130 may identify the most mentioned function in the description information as the main function.

The at least one processor 130 may acquire the function information and importance information of each function of the second sub-device 220 by analyzing at least one sentence included in the description information of the second sub-device 220.

The at least one processor 130 may acquire the description information of the second sub-device 220 among the plurality of description information stored in the memory in case that the second sub-device 220 is connected to the main device 100.

The at least one processor 130 may request the description information of the second sub-device 220 from an external server through the communication interface 120 in case that the description information of the second sub-device 220 is not identified among the plurality of description information stored in the memory.

The external server may receive a signal requesting the description information of the second sub-device 220 from the main device 100. The external server may transmit the description information of the second sub-device 220 to the main device 100.

The at least one processor 130 may receive the description information of the second sub-device 220 from the external server.

Figure 2:
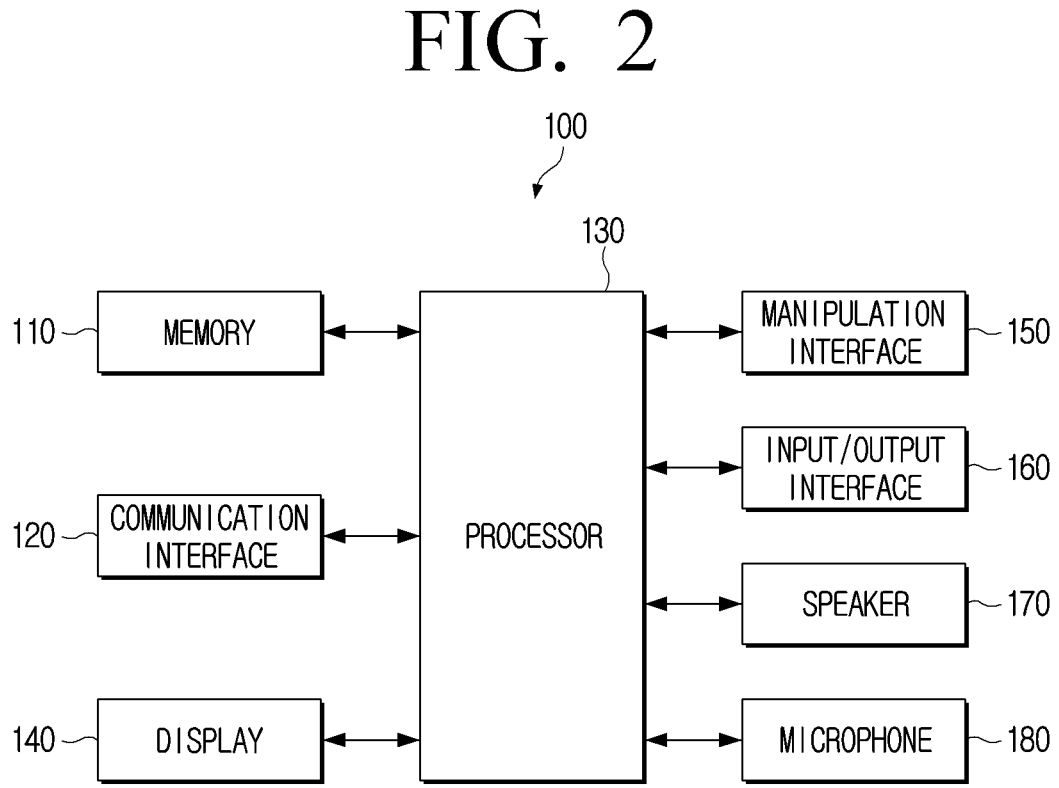
FIG. 2 is a block diagram for explaining a specific configuration of the main device of FIG. 1 according to an embodiment of the disclosure.

FIG. 2 is a block diagram for explaining a specific configuration of the main device 100 of FIG. 1 according to an embodiment of the disclosure.

Referring to FIG. 2, the main device 100 may include at least one of the memory 110, the communication interface 120, at least one processor 130, a display 140, a manipulation interface 150, an input/output interface 160, a speaker 170, or a microphone 180.

The memory 110 may be implemented as an internal memory such as a read-only memory (ROM, e.g., electrically erasable programmable read-only memory (EEPROM)) or a random access memory (RAM), included in the processor 130, or as a memory separate from the processor 130. In this case, the memory 110 may be implemented in the form of a memory embedded in the main device 100 or in the form of a memory detachable from the main device 100, based on a data storing purpose. For example, data for driving the main device 100 may be stored in the memory embedded in the main device 100, and data for the extended function of the main device 100 may be stored in the detachable memory in the main device 100.

The memory embedded in the main device 100 may be implemented as at least one of a volatile memory (e.g., dynamic RAM (DRAM), static RAM (SRAM) or synchronous dynamic RAM (SDRAM)), a non-volatile memory (e.g., one time programmable ROM (OTPROM), programmable ROM (PROM), erasable and programmable ROM (EPROM), electrically erasable and programmable ROM (EEPROM), a mask ROM, a flash ROM), a flash memory (e.g., NAND flash or NOR flash), a hard drive, or a solid state drive (SSD); and the memory detachable from the main device 100 may be implemented as a memory card (e.g., compact flash (CF), secure digital (SD), micro secure digital (Micro-SD), mini secure digital (mini-SD), extreme digital (xD), or multi-media card (MMC)), an external memory which may be connected to a universal serial bus (USB) port (e.g., USB memory), or the like.

The communication interface 120 is a component communicating with various types of external devices by using various types of communication methods. The communication interface 120 may include a wireless communication module and a wired communication module. Each communication module may be implemented in the form of at least one hardware chip.

The wireless communication module may be a module communicating with the external device in a wireless manner. For example, the wireless communication module may include at least one of a Wi-Fi module, a Bluetooth module, an infrared communication module, or other communication modules.

The Wi-Fi module and the Bluetooth module may respectively perform the communication in a Wi-Fi manner and a Bluetooth manner. In case of using the Wi-Fi module or the Bluetooth module, it is possible to first transmit and receive various connection information such as a service set identifier (SSID) or a session key, connect the communication by using this connection information, and then transmit and receive various information.

The infrared communication module may perform the communication based on infrared data association (IrDA) technology of transmitting data in a short distance in the wireless manner by using an infrared ray between visible and millimeter waves.

Other communication modules may include at least one communication chip performing the communication based on various wireless communication standards such as zigbee, third generation (3G), third generation partnership project (3GPP), long term evolution (LTE), LTE advanced (LTE-A), fourth generation (4G), and fifth generation (5G), in addition to the above-described communication method.

The wired communication module may be a module communicating with the external device in the wired manner. For example, the wired communication module may include at least one of a local area network (LAN) module, an Ethernet module, a pair cable, a coaxial cable, an optical fiber cable, or an ultra wide-band (UWB) module.

The at least one processor 130 may control an overall operation of the main device 100. The processor 130 may function to control the overall operation of the main device 100.

The processor 130 may be implemented as a digital signal processor (DSP) processing a digital signal, a microprocessor, or a time controller (TCON). However, the processor 130 is not limited thereto, and may include at least one of a central processing unit (CPU), a micro controller unit (MCU), a micro processing unit (MPU), a controller, an application processor (AP), a graphics-processing unit (GPU), a communication processor (CP), or an advanced reduced instruction set computer (RISC) machine (ARM) processor, or may be defined by these terms. In addition, the processor 130 may be implemented as a system-on-chip (SoC) or a large scale integration (LSI), in which a processing algorithm is embedded, or may be implemented in the form of a field programmable gate array (FPGA). In addition, the processor 130 may perform various functions by executing computer executable instructions stored in the memory.

The display 140 may be implemented as any of various types of displays such as a liquid crystal display (LCD), an organic light emitting diode (OLED) display, a plasma display panel (PDP), and the like. The display 140 may also include a driving circuit, a backlight unit, and the like, which may be implemented in a form such as an amorphous silicon thin film transistor (a-si TFT), a low temperature poly silicon (LTPS) TFT, or an organic TFT (OTFT). The display 140 may be implemented as a touch screen combined with a touch sensor, a flexible display, a three-dimensional (3D) display, or the like. In addition, the display 140 according to one or more embodiments of the disclosure may include not only a display panel outputting an image, but also a bezel housing the display panel. In particular, the bezel may include a touch sensor (not shown) detecting user interaction according to an embodiment of the disclosure.

The manipulation interface 150 may be implemented as a device such as a button, a touch pad, a mouse, or a keyboard, or may be implemented as a touch screen capable of also performing a manipulation input function in addition to the above-described display function. Here, the button may be any of various types of buttons such as a mechanical button, a touch pad, or a wheel, which is positioned on any region of a body appearance of the main device 100, such as its front surface, side surface, or rear surface.

The input/output interface 160 may be any of a high definition multimedia interface (HDMI), a mobile high-definition link (MHL), a universal serial bus (USB), a display port (DP), a thunderbolt, a video graphics array (VGA) port, a red-green-blue (RGB) port, a D-subminiature (D-SUB), or a digital visual interface (DVI). The input/output interface 160 may input/output at least one of audio or video signals. In some implementation examples, the input/output interface 160 may include a port inputting and outputting only the audio signal and a port inputting and outputting only the video signal as its separate ports, or may be implemented as a single port inputting and outputting both the audio signal and the video signal. The main device 100 may transmit at least one of the audio and video signals to the external device (e.g., external display device or external speaker) through the input/output interface 160. In detail, an output port included in the input/output interface 160 may be connected to the external device, and the main device 100 may transmit at least one of the audio and video signals to the external device through the output port.

The speaker 170 may be a component outputting not only various audio data but also various notification sounds or voice messages.

The microphone 180 may be a component receiving the user voice or other sounds and convert the same into the audio data. The microphone 180 may receive the user voice while the microphone is activated. For example, the microphone 180 may be integrated with the main device 100 in the upper, front, or side direction of the main device 100. The microphone 180 may include various components such as a microphone collecting the user voice in an analog form, an amplifier circuit amplifying the collected user voice, an analog to digital (A/D) converter circuit sampling the amplified user voice and converting the same into a digital signal, and a filter circuit removing a noise component from the converted digital signal.

Figure 3:
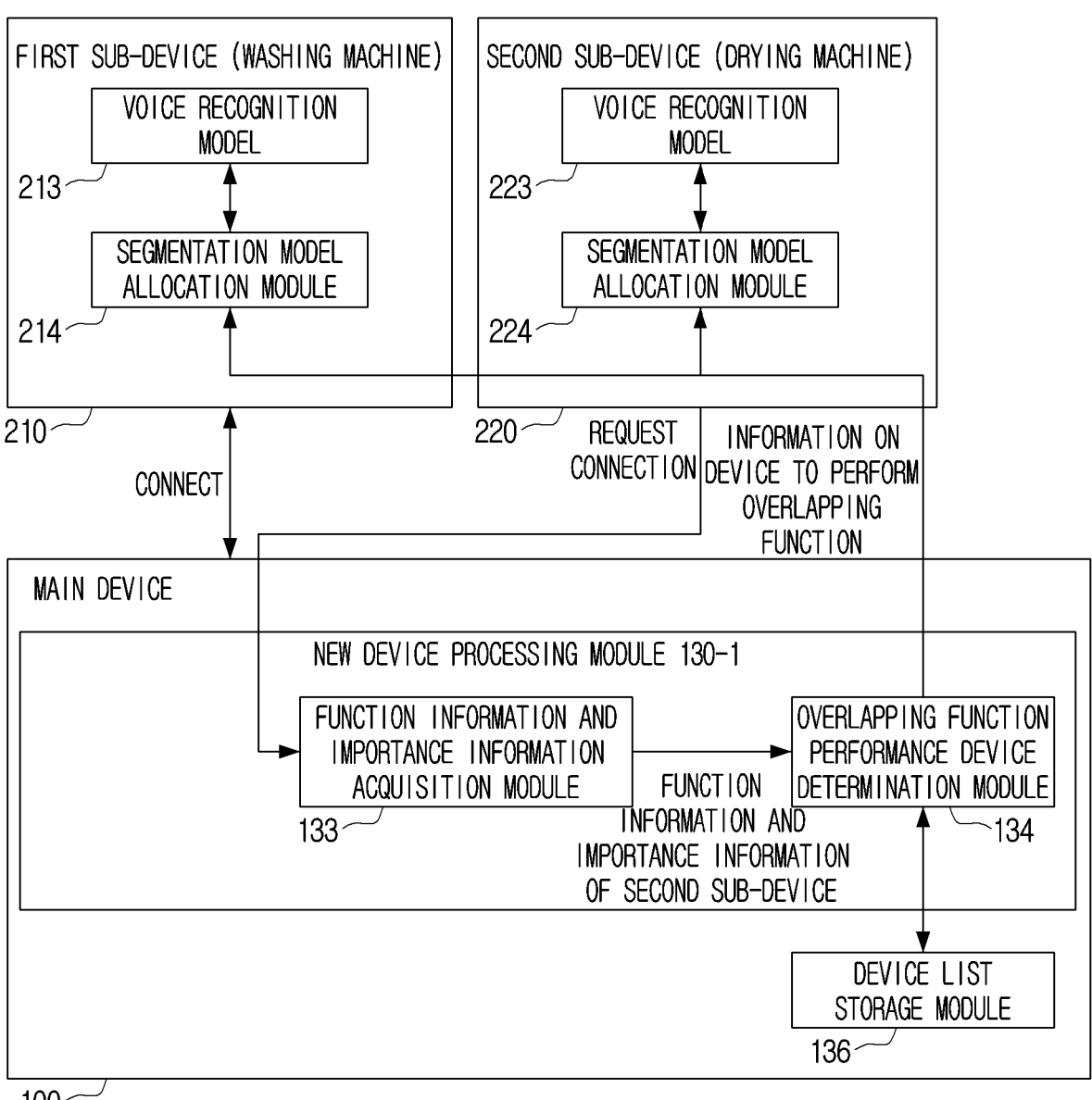
FIG. 3 is a block diagram for explaining an operation of processing an overlapping function according to an embodiment of the disclosure.

FIG. 3 is a block diagram for explaining an operation of processing the overlapping function according to an embodiment of the disclosure.

Referring to FIG. 3, the main device 100 may include at least one of a new device processing module 130-1 and a device list storage module 136.

It is assumed that the main device 100 is connected to the first sub-device 210. The main device 100 may store information on the first sub device 210 in the form of a device list. The main device 100 may store the function information of the first sub device 210 and the importance information of each function in the device list storage module 136.

The new device processing module 130-1 may include at least one of the function information and importance information acquisition module 133 or an overlapping function performance device determination module 134.

The second sub-device 220 may be newly connected to the main device 100. The second sub-device 220 may transmit the connection request to the main device 100. In case that the main device 100 accepts the connection request from the second sub-device 220, the main device 100 may identify that the second sub-device 220 is newly connected thereto.

The function information and importance information acquisition module 133 may acquire the function information and importance information of each function of the second sub-device 220. The function information and importance information acquisition module 133 may acquire function information indicating at least one function that may be performed by the second sub-device 220.

The function information and importance information acquisition module 133 may classify at least one identified function into the main function and the auxiliary function. The function information and importance information acquisition module 133 may determine the importance of the main function as having a higher value than the importance of the auxiliary function.

The main function and the auxiliary function may be pre-determined for each device.

For example, it may be assumed that the second sub-device 220 is a drying machine, and functions of the drying machine are drying and dust removal. The function information and importance information acquisition module 133 may acquire importance (0.9) of the drying function and importance (0.7) of the dust removal.

The function information and importance information acquisition module 133 may transmit the function information and importance information of the acquired second sub-device 220 to the overlapping function performance device determination module 134.

The overlapping function performance device determination module 134 may determine whether a function overlapping that of a previously stored (or previously connected) device exists based on the function information of the second sub-device 220 that is received from the function information and importance information acquisition module 133.

The overlapping function performance device determination module 134 may determine whether the overlapping function exists based on the device list for the function information of the second sub-device 220 that is stored in the device list storage module 136. The overlapping function performance device determination module 134 may determine whether the function of the second sub-device 220 is included in the plurality of functions included in the device list storage module 136.

In case that the function of the second sub-device 220 is included in the plurality of functions included in the device list storage module 136, the overlapping function performance device determination module 134 may determine that the included function is the overlapping function. In addition, the overlapping function performance device determination module 134 may acquire the importance information corresponding to the overlapping function. In addition, the overlapping function performance device determination module 134 may determine which device is to perform the overlapping function by comparing the importance of the overlapping function of the second sub-device 220 with the importance of the overlapping function stored in the device list. The overlapping function performance device determination module 134 may transmit information on the device to perform the overlapping function to the first sub-device 210 and the second sub-device 220.

For example, the overlapping function performance device determination module 134 may acquire importance (0.9) of the overlapping function (drying) of the second sub-device 220. In addition, the overlapping function performance device determination module 134 may acquire importance (0.5) of the overlapping function (drying) of the first sub-device 210 from the device list storage module 136. The importance (0.9) of the overlapping function (drying) of the second sub-device 220 may be greater than the importance (0.5) of the overlapping function (drying) of the first sub-device 210. The overlapping function performance device determination module 134 may determine that the overlapping function (drying) is to be performed by the second sub-device 220. In addition, the overlapping function performance device determination module 134 may transmit information indicating that the overlapping function (drying) is performed by the second sub-device 220 to the first sub-device 210 and the second sub-device 220.

The first sub-device 210 may include at least one of a voice recognition model 213 or a segmentation model allocation module 214. The voice recognition model 213 may be a model generating the response by performing a voice recognition operation in response to the user input. The voice recognition model 213 may include the plurality of segmentation models. The voice recognition model 213 may allocate various functions by using the plurality of segmentation models.

For example, it may be assumed that the voice recognition model 213 includes 10 segmentation models. In addition, it may be assumed that the first sub-device 210 storing the voice recognition model 213 is to perform a first function (washing) and a second function (drying). Considering that the first sub-device 210 performs the plurality of functions, 7 segmentation models out of 10 segmentation models may be allocated to the first function (washing) and 3 segmentation models may be allocated to the second function (drying).

The segmentation model allocation module 214 may receive the information on the device to perform the overlapping function from the overlapping function performance device determination module 134. It may be assumed that the information on the device to perform the overlapping function includes the information of the second sub-device 220.

The first sub-device 210 may determine that a function previously performed by the first sub-device 210 is no longer performed by the first sub-device 210 but performed by the second sub-device 220. In addition, the first sub-device 210 may use the resource by considering only the remaining function without considering the overlapping function to efficiently use the resource.

The segmentation model allocation module 214 may determine that the voice recognition model 213 no longer allocates the overlapping function determined to be performed by the second sub-device 220. The segmentation model allocation module 214 may determine to allocate only the remaining function except for the overlapping function to the voice recognition model 213.

A segmentation model allocation module 214 of the second sub-device 220 may allocate at least one function including the overlapping function determined to be performed by the second sub-device 220 to the voice recognition model 223.

The resource may be a resource of the device itself or a resource of an artificial intelligence model itself.

The first sub-device 210 may have a determined resource (or a memory processing capability), and the segmentation model allocation module 214 may allocate all the resource for the remaining function (washing) except for the overlapping function (drying).

The first sub-device 210 may have a predetermined number of layers included in the voice recognition model, and the segmentation model allocation module 214 may allocate all the layers for the remaining function (washing) except for the overlapping function (drying).

The first sub-device 210 may have a predetermined number of segmentation models included in the voice recognition model, and the segmentation model allocation module 214 may allocate all the segmentation models for the remaining function (washing) except for the overlapping function (drying).

Figure 4:
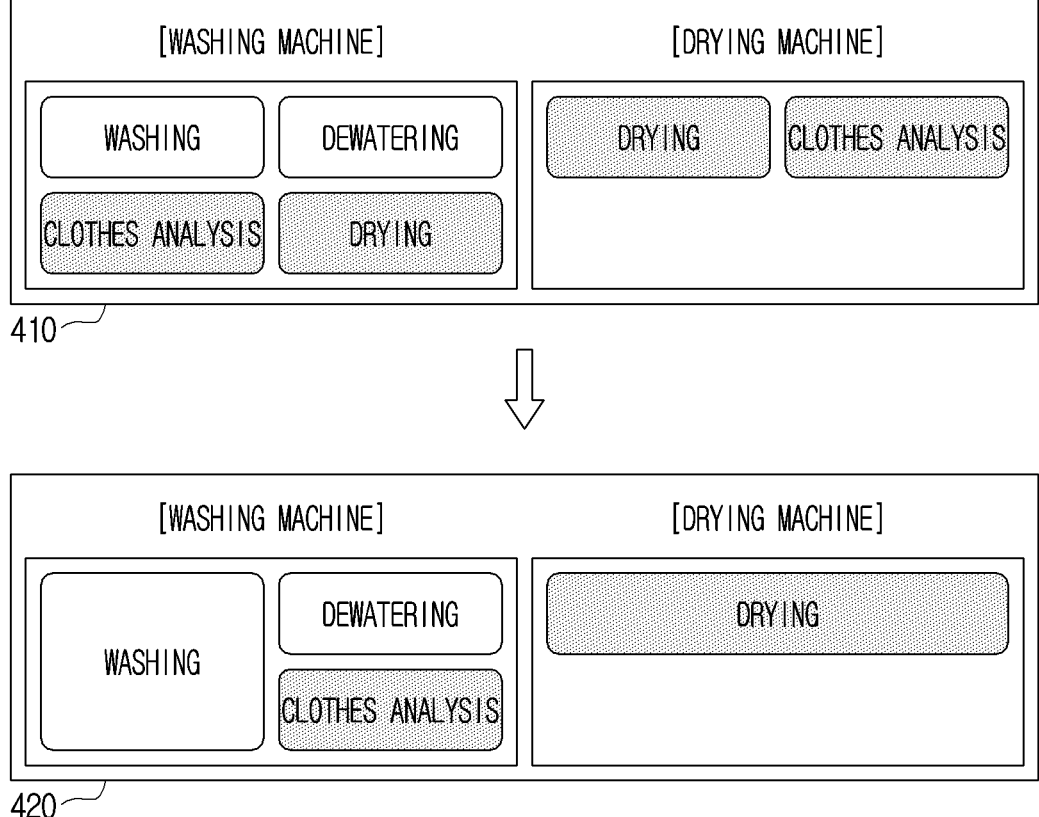
FIG. 4 is a view for explaining processing of a plurality of overlapping functions according to an embodiment of the disclosure.

FIG. 4 is a view for explaining processing of the plurality of overlapping functions according to an embodiment of the disclosure.

Referring to FIG. 4, in the example 410, functions that may be performed by the washing machine are washing, dewatering, clothes analysis, and drying. The main device 100 may be connected to the drying machine, which is a new device, in a state where the main device 100 may be connected to the washing machine. In case that the new device is connected thereto, the main device 100 may acquire a function that may be performed by the drying machine. It may be assumed that the functions that may be performed in the drying machine may be drying and clothes analysis.

The main device 100 may compare the function that may be performed by the washing machine with the function that may be performed by the drying machine. In addition, the main device 100 may identify the 'drying' function and the 'clothing analysis' function as the overlapping functions.

The main device 100 may determine which device is to perform each of the plurality of overlapping functions. The main device 100 may determine that washing machine is to perform the first function (or clothes analysis) among the plurality of overlapping functions. The main device 100 may determine that the drying machine is to perform the second function (or the drying) among the plurality of overlapping functions.

The main device 100 may acquire the importance of the overlapping function of each device. For example, the main device 100 may acquire the importance of the overlapping functions (clothes analysis and drying) of the washing machine. In addition, the main device 100 may acquire the importance of the overlapping functions (clothes analysis and drying) of the drying machine. In addition, the main device 100 may compare the importance and determine that a device with the higher importance is to perform the overlapping function.

Referring to an example 420 of FIG. 4, the main device 100 may determine that the washing machine is to perform the first function (clothes analysis) and the drying machine is to perform the second function (drying).

The washing machine may no longer perform the drying function, and reallocate the resource to the voice recognition model based on the remaining functions (washing, dewatering, and clothes analysis) except for the drying function.

The drying machine may no longer perform the clothes analysis function, and reallocate the resource to the voice recognition model based on the remaining function (drying) except for the clothes analysis function.

Figure 5:
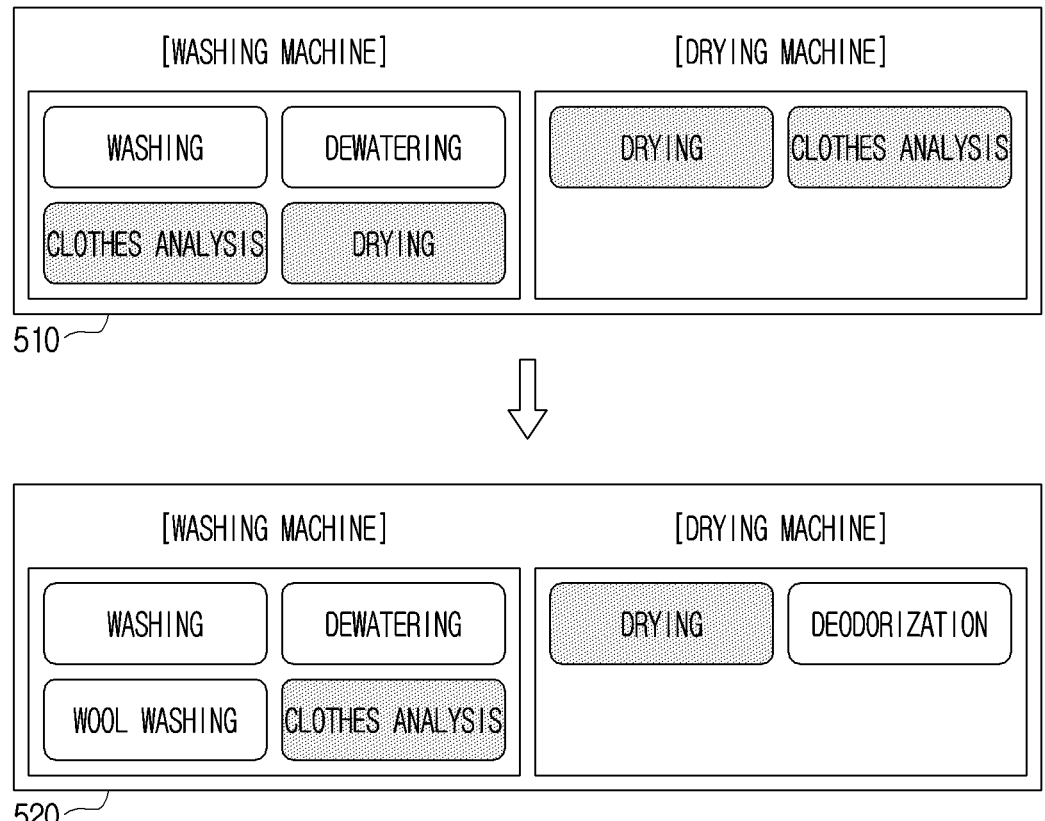
FIG. 5 is a view for explaining processing of a plurality of overlapping functions according to an embodiment of the disclosure.

FIG. 5 is a view for explaining processing of the plurality of overlapping functions according to an embodiment of the disclosure.

Referring to FIG. 5, an example 510 may correspond to the embodiment 410 of FIG. 4. The description thus omits redundant descriptions thereof.

Referring to an example 520 of FIG. 5, the main device 100 may determine that the washing machine is to perform the first function (clothes analysis) and the drying machine is to perform the second function (drying).

The washing machine may no longer perform the drying function, and may perform a new function (wool washing) instead of the drying function. The wool washing function may be a function that is not allocated to the voice recognition model of the washing machine due to an existing resource limitation. In case that a spare resource is generated by excluding the drying function, the washing machine may allocate, to the voice recognition model, the most important function (wool washing) among the functions not allocated to the voice recognition model.

The drying machine may no longer perform the clothes analysis function, and perform a new function (deodorization) instead of the clothes analysis function. The deodorization function may be a function that is not allocated to the voice recognition model of the drying machine due to the existing resource limitation. In case that a spare resource is generated by excluding the clothes analysis function, the drying machine may allocate, to the voice recognition model, the most important function (deodorization) among the functions not allocated to the voice recognition model.

Figure 6:
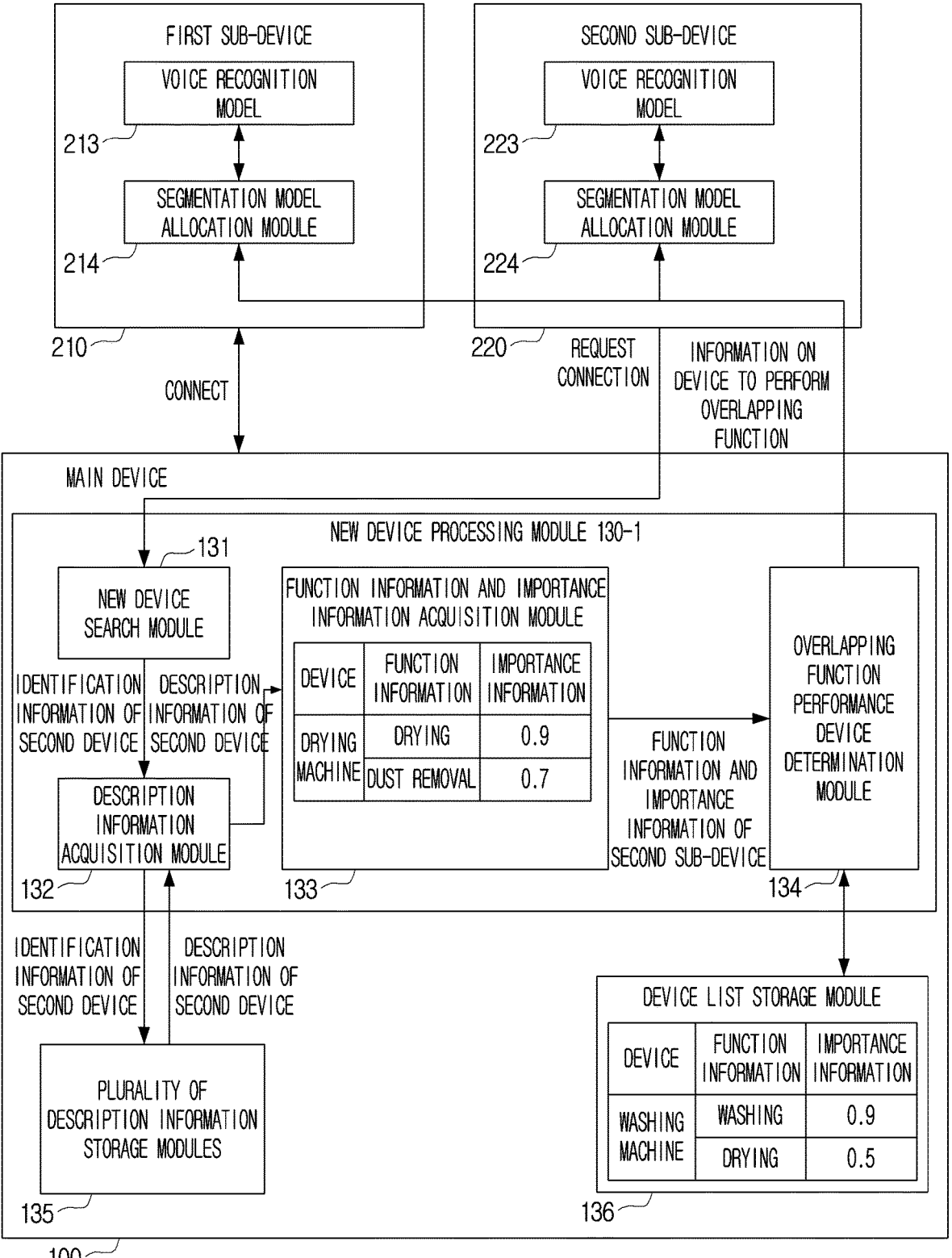
FIG. 6 is a block diagram for explaining an operation of processing an overlapping function according to an embodiment of the disclosure.

FIG. 6 is a block diagram for explaining an operation of processing the overlapping function according to an embodiment of the disclosure.

Referring to FIG. 6, the main device 100 may include at least one of the new device processing module 130-1, a plurality of description information storage modules 135, or the device list storage module 136.

It is assumed that the main device 100 is connected to the first sub-device 210. The main device 100 may store information on the first sub device 210 in a form of the device list. The main device 100 may store the function information of the first sub device 210 and the importance information of each function in the device list storage module 136.

The new device processing module 130-1 may include at least one of a new device search module 131, a description information acquisition module 132, the function information and importance information acquisition module 133, and the overlapping function performance device determination module 134.

The second sub-device 220 may be newly connected to the main device 100. The second sub-device 220 may transmit the connection request to the main device 100. In case that the main device 100 accepts the connection request from the second sub-device 220, the main device 100 may identify that the second sub-device 220 is newly connected thereto through the new device search module 131.

In case of identifying that the second sub-device 220 is newly connected thereto, the main device 100 may transmit the identification information of the second sub-device 220 to the description information acquisition module 132.

The description information acquisition module 132 may transmit the identification information of the second sub-device 220 that is received from the new device search module 131 to the plurality of description information storage modules 135.

The plurality of description information storage modules 135 may receive the identification information of the second sub-device 220 from the description information acquisition module 132. The plurality of description information storage modules 135 may acquire description information corresponding to the identification information of the second sub-device 220 among the plurality of stored description information. The plurality of description information storage modules 135 may transmit the description information of the second sub-device 220 to the description information acquisition module 132.

The description information acquisition module 132 may receive the description information of the second sub-device 220 from the plurality of description information storage modules 135. The description information acquisition module 132 may transmit the description information of the second sub-device 220 to the function information and importance information acquisition module 133.

The function information and importance information acquisition module 133 may acquire the function information and importance information of each function of the second sub-device 220 by analyzing the description information of the second sub-device 220 received from the description information acquisition module 132. The function information and importance information acquisition module 133 may acquire the function information indicating at least one function that may be performed by the second sub-device 220 by analyzing at least one sentence included in the description information.

In addition, the function information and importance information acquisition module 133 may acquire the importance information of at least one function that may be performed by the second sub-device 220. The function information and importance information acquisition module 133 may identify a function included in the description information, and acquire importance information corresponding to the identified function.

The function information and importance information acquisition module 133 may classify at least one identified function into the main function and the auxiliary function based on the description information. The function information and importance information acquisition module 133 may determine the importance of the main function as having a higher value than the importance of the auxiliary function.

The criterion determining the main function and auxiliary function may be the number of words included in the description information. The function information and importance information acquisition module 133 may compare the number of words representing the first function with the number of words representing the second function. In case that the number of words representing the first function is greater than the number of words representing the second function, the function information and importance information acquisition module 133 may determine that the first function is a more important function than the second function. The function information and importance information acquisition module 133 may identify the most mentioned function in the description information as the main function.

For example, it may be assumed that the second sub-device 220 is a drying machine, and functions of the drying machine are drying and dust removal. The description information acquisition module 132 may acquire description information corresponding to the drying machine from the plurality of description information storage modules 135. In addition, the function information and importance information acquisition module 133 may acquire importance (0.9) of the drying function and importance (0.7) of the dust removal based on the description information.

The description describes the function information and importance information acquisition module 133, the overlapping function performance device determination module 134, the device list storage module 136, the first sub-device 210, the second sub-device 220, and the like with reference to FIG. 3. The description thus omits redundant descriptions thereof.

Figure 7:
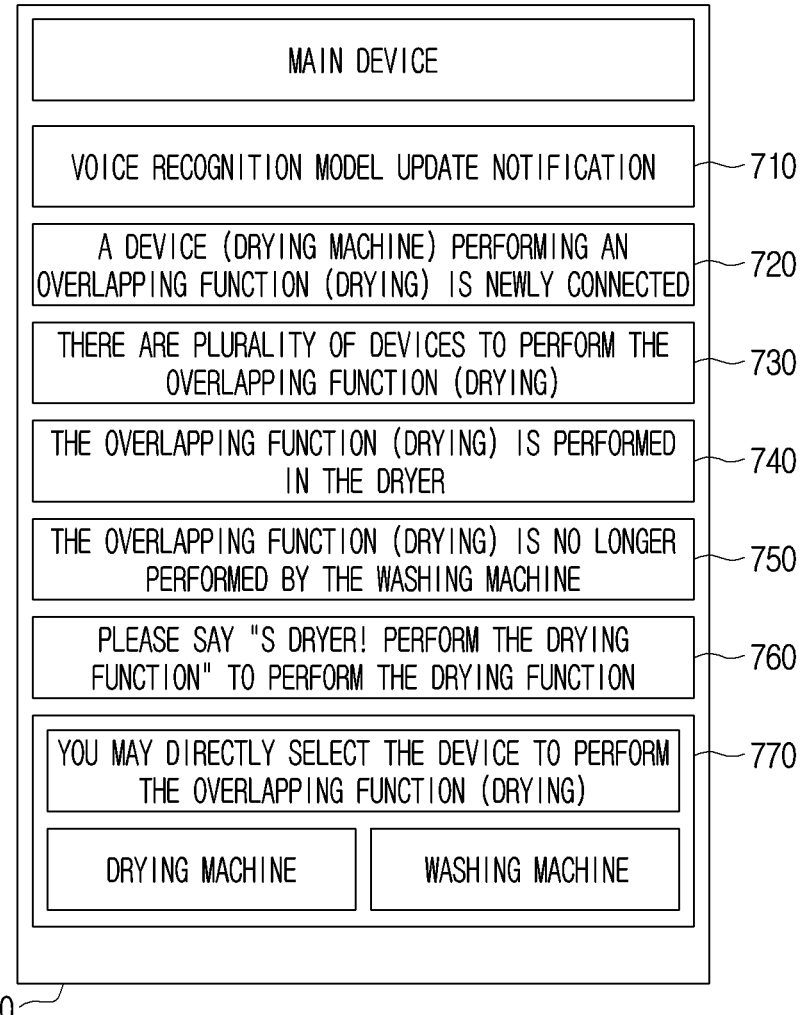
FIG. 7 is a view for explaining a screen displayed on the main device according to an embodiment of the disclosure.

FIG. 7 is a view for explaining a screen displayed on the main device 100 according to an embodiment of the disclosure.

Referring to FIG. 7, the main device 100 may display a screen 700 related to processing of the overlapping function.

In case of identifying the overlapping function from a newly connected device, the main device 100 may provide (or display) the screen 700 including a processing result of the overlapping function.

The screen 700 may include at least one of a user interface (UI) 710 including information notifying that the voice recognition model is updated, a UI 720 representing the overlapping function and the connection of a new device to perform the overlapping function, a UI 730 representing that the plurality of devices to perform the overlapping functions exist, a UI 740 representing which device to perform the overlapping function, a UI 750 representing that the overlapping function is not performed by a specific device, a UI 760 guiding a user speech operation for performing the overlapping function, or a UI 770 selecting a device to perform the overlapping function.

In case of identifying the overlapping function, the main device 100 may determine the target device to perform the overlapping function. The UI 740 may be a UI notifying a user of information on the determined target device.

Although the target device is determined, the user may directly select the target device to perform the overlapping function. The UI 770 may be a UI for the user to select the target device.

FIG. 8 is a view for explaining a screen displayed on a sub-device according to an embodiment of the disclosure.

Referring to FIG. 8, the sub-devices 210 and 220 may display a screen 800 related to processing of the overlapping function.

In case of receiving the result information on the overlapping function from the main device 100, the sub-device may provide (or display) the screen 800 including a processing result of the overlapping function.

The screen 800 may include at least one of a UI 810 including information indicating that the voice recognition model is updated, a UI 820 representing the overlapping function and the connection of a new device to perform the overlapping function, a UI 830 representing that the overlapping function is not performed by the sub-device, a UI 840 representing that the resource is saved by performing no overlapping function, a UI 850 representing that the overlapping function is performed by another sub-device, or a UI 860 guiding a user speech operation for performing the overlapping function.

Figure 9:
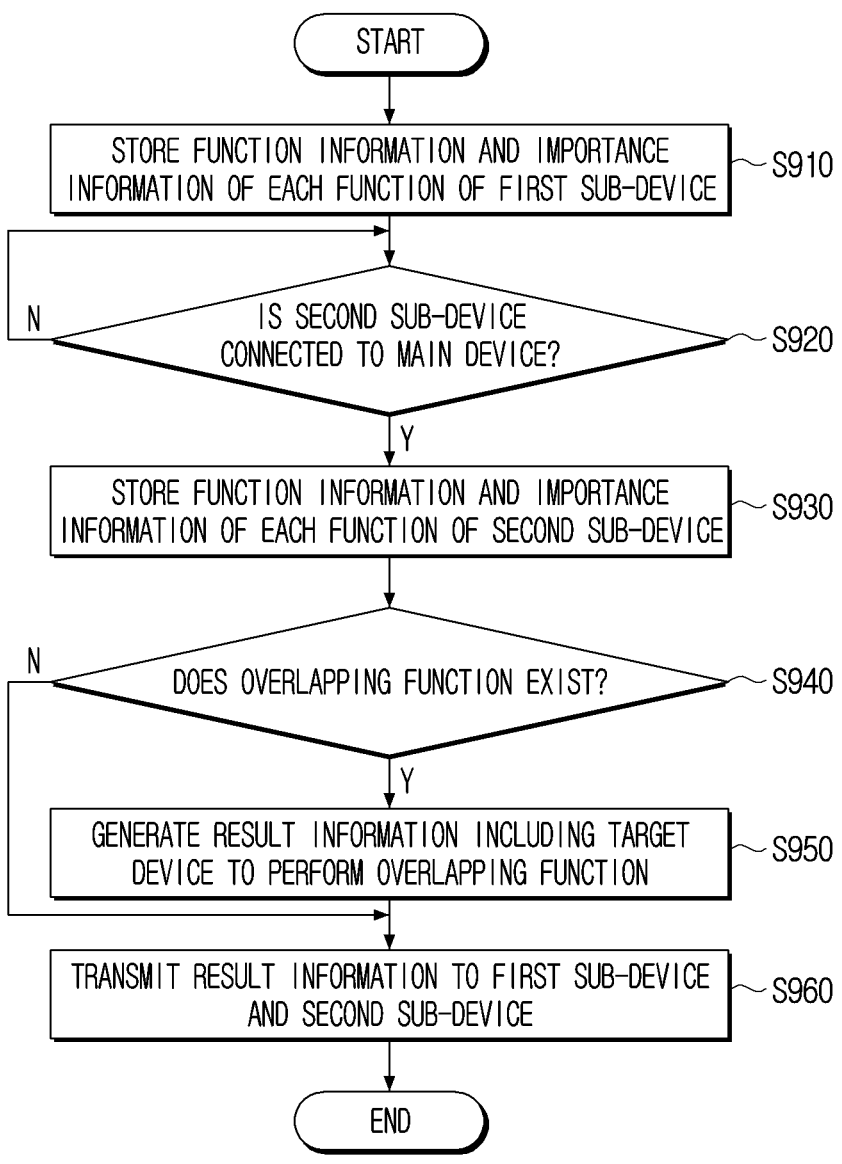
FIG. 9 is a flowchart for explaining an operation of determining a target device to perform an overlapping function according to an embodiment of the disclosure.

FIG. 9 is a flowchart for explaining an operation of determining the target device to perform the overlapping function according to an embodiment of the disclosure.

Referring to FIG. 9, it may be assumed that the main device 100 and the first sub-device 210 are connected to each other. The main device 100 may store the function information and importance information of each function of the first sub-device 210 at operation S910. The main device 100 may identify whether the second sub-device 220 is connected thereto at operation S920.

In case that the second sub-device 220 is not connected thereto at operation S920-N, the main device 100 may repeatedly check whether a new device is connected thereto.

In case that the second sub-device 220 is connected thereto at operation S920-Y, the main device 100 may acquire and store the function information and importance information of each function of the second sub-device 220 at operation S930.

After acquiring the information on the second sub-device 220, the main device 100 may identify whether the overlapping function exists at operation S940. In detail, the main device 100 may compare the function information of the first sub-device 210 with the function information of the second sub-device 220. The main device 100 may identify the overlapping function by comparing the function that may be performed by the first sub-device 210 with the function that may be performed by the second sub-device 220.

The main device 100 may generate the result information including the target device to perform the overlapping function at operation S950. The main device 100 may determine the target device by comparing the importance information of each function of the first sub-device 210 with the importance information of each function of the second sub-device 220. The target device may be determined as the first sub-device 210 or the second sub-device 220.

The main device 100 may identify the overlapping function, and determine the target device by determining which device has a higher importance for the overlapping function. In case of determining the target device, the main device 100 may generate the result information including the information on the overlapping function and the target device to perform the overlapping function (or the identification information).

In case of generating the result information, the main device 100 may transmit the result information to the first sub-device 210 and the second sub-device 220 at operation S960.

Figure 10:
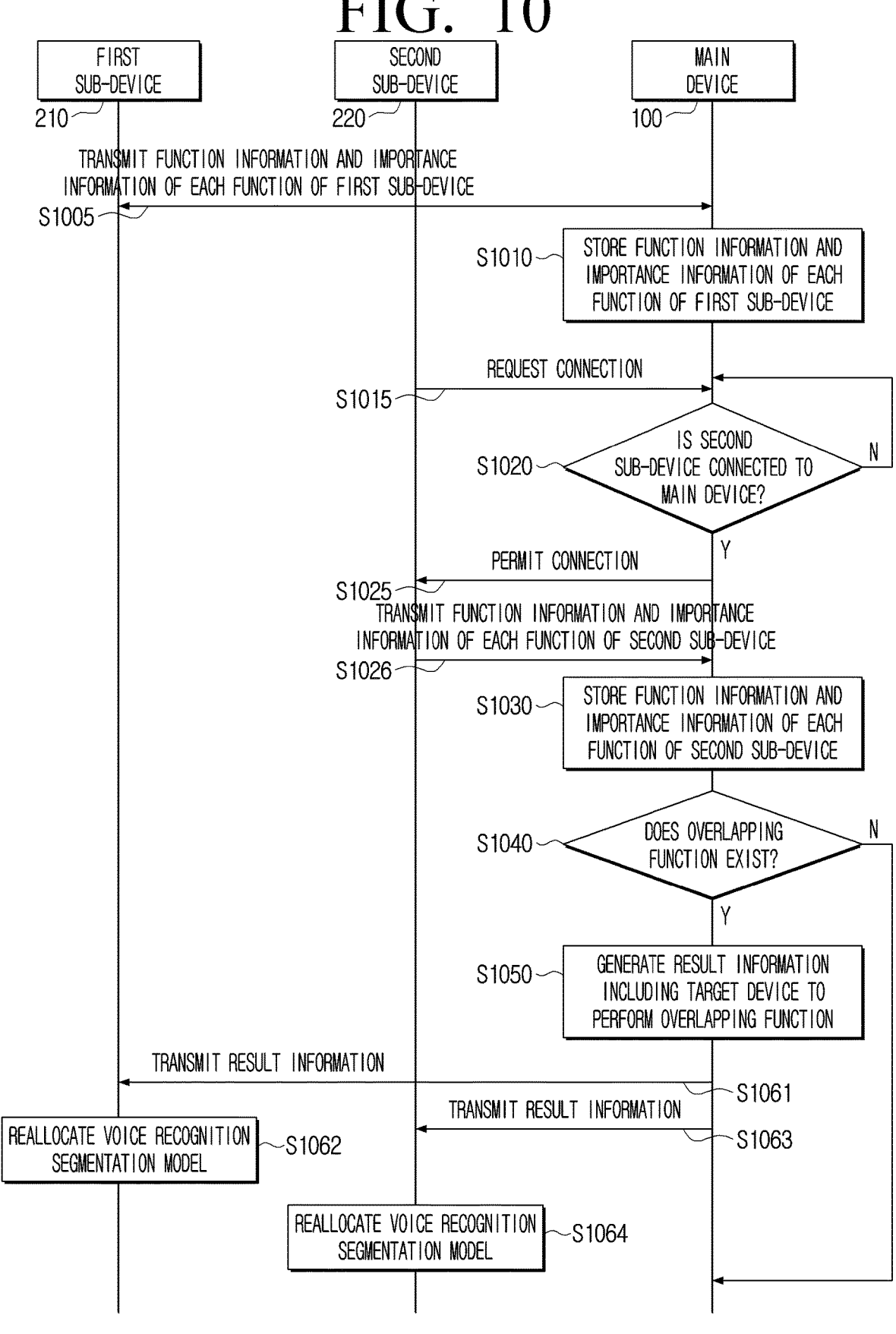
FIG. 10 is a flowchart for explaining an operation of reallocating a voice recognition segmentation model based on result information including the target device to perform the overlapping function according to an embodiment of the disclosure.

FIG. 10 is a flowchart for explaining an operation of reallocating the voice recognition segmentation model based on the result information including the target device to perform the overlapping function according to an embodiment of the disclosure.

Operations S1010, S1020, S1030, S1040, and S1050 of FIG. 10 may correspond to the operations S910, S920, S930, S940, and S950 of FIG. 9. The description thus omits redundant descriptions thereof.

It is assumed that the first sub-device 210 is connected to the main device 100. The first sub-device 210 may transmit the function information and importance information of each function of the first sub-device 210 to the main device 100 at operation S1005.

The main device 100 may store the function information and importance information of each function received from the first sub-device 210 at operation S1010.

In a state where the main device 100 and the first sub-device 210 are connected to each other, the second sub-device 220 may be newly connected to the main device 100. The second sub-device 220 may transmit a signal requesting the connection to the main device 100 at operation S1015.

In case of receiving the connection request from the second sub-device 220, the main device 100 may determine whether to permit the connection request from the second sub-device 220. In case that permitting the connection request from the second sub-device 220, the main device 100 may transmit a signal permitting the connection to the second sub-device 220 at operation S1025.

The second sub-device 220 may receive the signal permitting the connection from the main device 100. The second sub-device 220 may transmit the function information and importance information of each function of the second sub-device 220 to the main device 100 at operation S1026.

The main device 100 may acquire the function information and importance information of each function of the second sub-device 220 from the second sub-device 220. In addition, the main device 100 may perform the operations S1030 to S1050.

After acquiring the result information, the main device 100 may transmit the result information to the first sub-device 210 at operation S1061. The first sub-device 210 may reallocate the voice recognition segmentation model based on the result information received from the main device 100 at operation S1062. In detail, the first sub-device 210 may determine a function to be allocated to the voice recognition segmentation model based on the result information. In addition, the first sub-device 210 may perform an operation of reallocating the determined function to the voice recognition segmentation model.

After acquiring the result information, the main device 100 may transmit the result information to the second sub-device 220 at operation S1063. The second sub-device 220 may reallocate the voice recognition segmentation model based on the result information received from the main device 100 at operation S1064. The second sub-device 220 may determine the function to be allocated to the voice recognition segmentation model based on the result information. In addition, the second sub-device 220 may perform an operation of reallocating the determined function to the voice recognition segmentation model.

Figure 11:
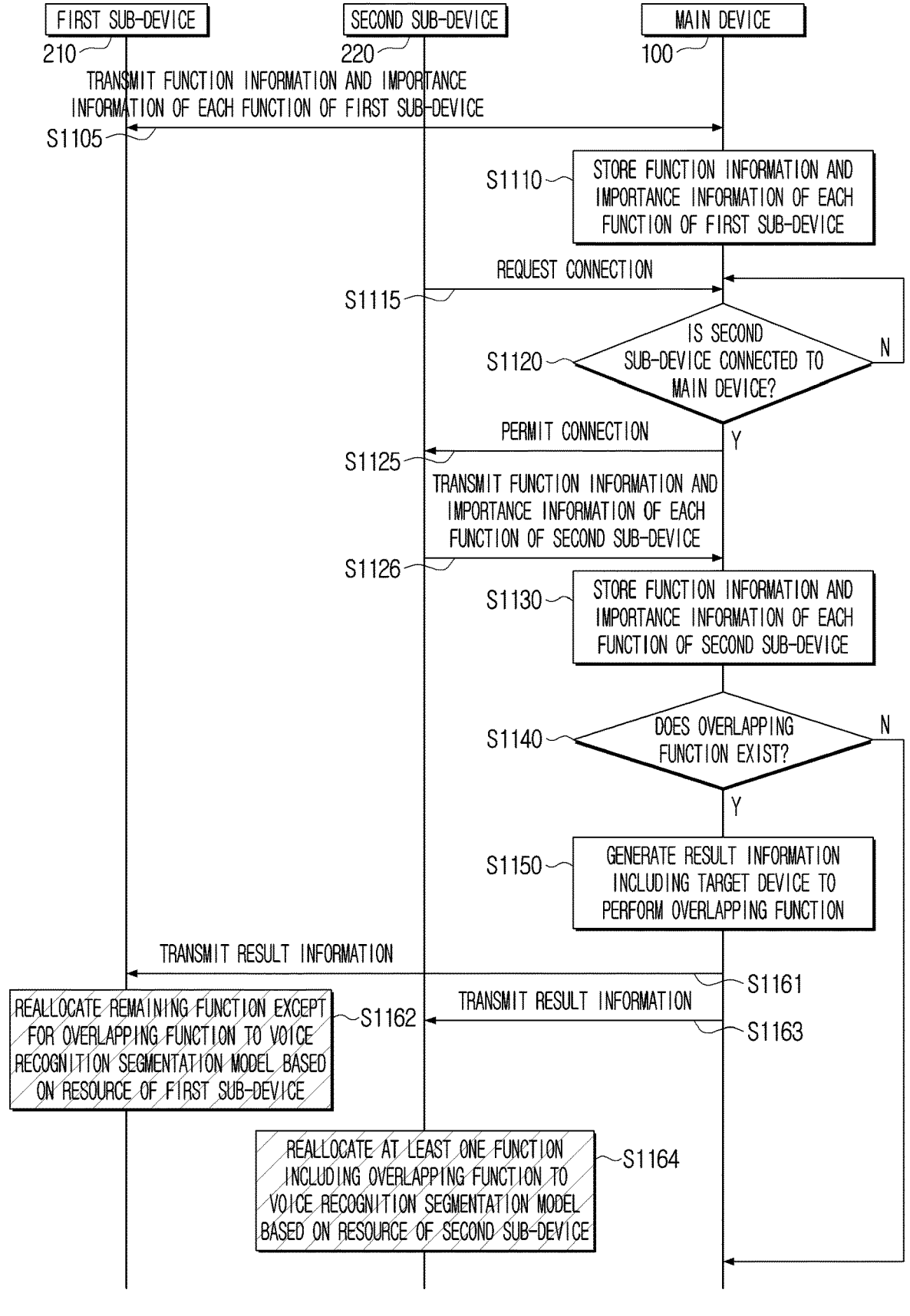
FIG. 11 is a flowchart for explaining an operation of a first or second sub-device processing the overlapping function according to an embodiment of the disclosure.

FIG. 11 is a flowchart for explaining an operation of the first or second sub-device processing the overlapping function according to an embodiment of the disclosure.

Operations S1105, S1110, S1115, S1120, S1125, S1126, S1130, S1140, S1150, S1161, and S1163 of FIG. 11 may correspond to the operations S1005, S1010, S1015, S1020, S1025, S1026, S1030, S1040, S1050, S1061, and S1063 of FIG. 10. The description thus omits redundant descriptions thereof.

In an embodiment illustrated in FIG. 11, it may be assumed that the main device 100 determines that the second sub-device 220 is to perform the overlapping function. The result information may include the information indicating that the overlapping function is performed by the second sub-device 220.

In case of receiving the result information from the main device 100, the first sub-device 210 may reallocate the remaining function except for the overlapping function to the voice recognition segmentation model based on the resource of the first sub-device 210 at operation S1162.

In case of receiving the result information from the main device 100, the second sub-device 220 may reallocate at least one function including the overlapping function to the voice recognition segmentation model based on the resource of the second sub-device 220 at operation S1164.

Figure 12:
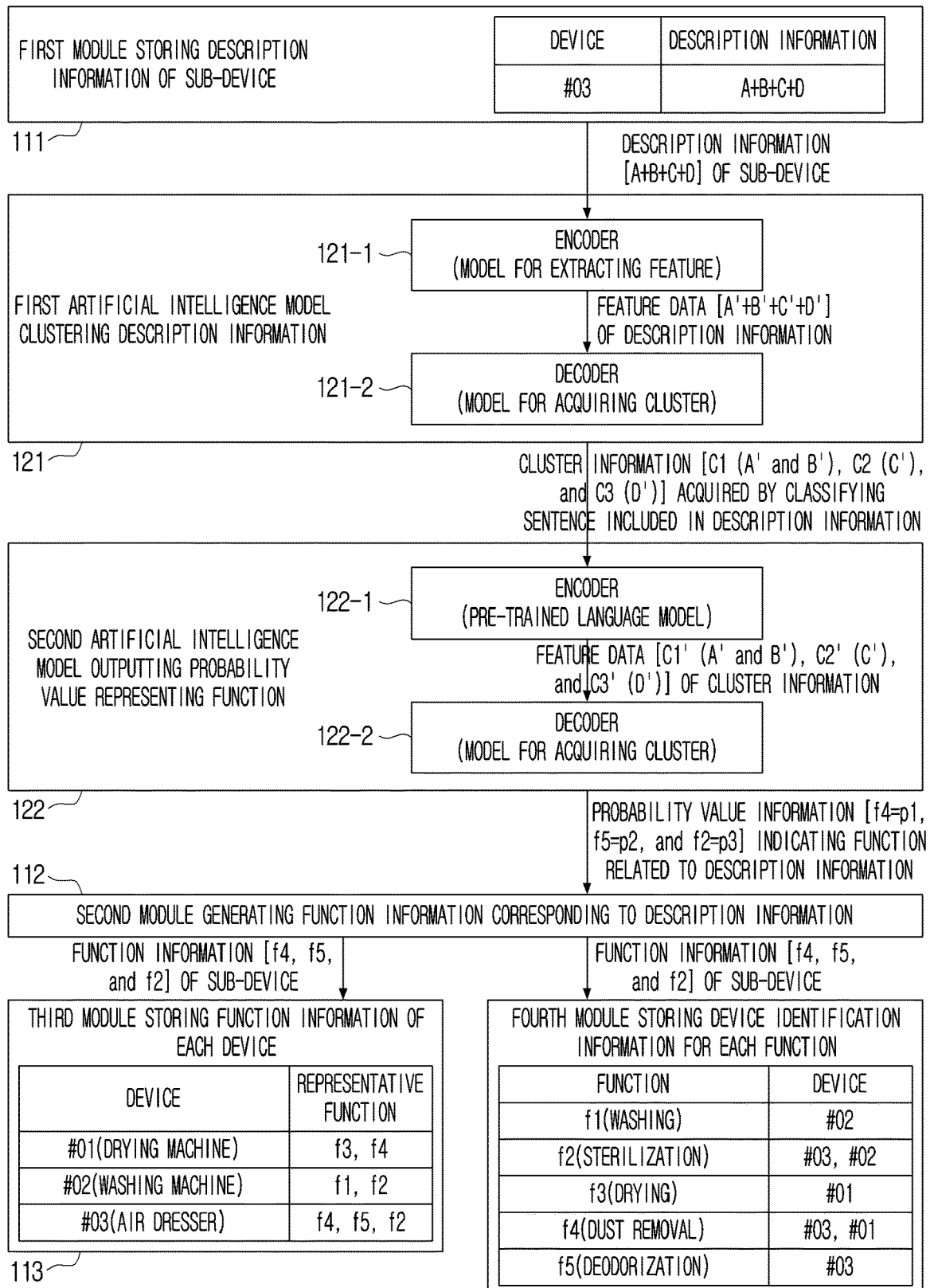
FIG. 12 is a view for explaining a main device generating function information of a device according to an embodiment of the disclosure.

FIG. 12 is a view for explaining the main device 100 generating function information of a device according to an embodiment of the disclosure.

Referring to FIG. 12, the main device 100 may generate the function information of the sub-device 200 based on the description information of the sub-device 200. In addition, the main device 100 may store the generated function information of the sub-device 200.

The main device 100 may include at least one of a first module 111, a first artificial intelligence model 121, a second artificial intelligence model 122, a second module 112, a third module 113, or a fourth module 114.

The first module 111 may be a module storing the description information of the sub-device 200. The first module 111 may acquire and store the description information of the sub-device 200.

The description information may be text data describing the function of a device. The description information may include at least one of at least one text data or image data representing at least one function that the device may perform.

The description information may be acquired in various ways.

The first module 111 may directly receive the description information from the sub-device 200. The sub-device 200 may internally store the description information in the internal memory. In addition, in case of receiving the request from the main device 100, the sub-device 200 may transmit the description information stored in the internal memory to the main device 100.

The first module 111 may receive metadata including the description information from the sub-device 200. In case of receiving the request from the main device 100, the sub-device 200 may transmit the metadata stored in the internal memory to the main device 100. The main device 100 may acquire the description information based on the metadata received from the sub-device 200.

The main device 100 may acquire the description information of the sub-device 200 through the external server. The external server may be a server providing a search service. The main device 100 may request the description information of the sub-device 200 from the external server. The external server may transmit the description information of the sub-device 200 requested from the main device 100 to the main device 100. The main device 100 may receive the description information from the external server.

The first module 111 may store the acquired (or received) description information of the sub-device 200. The first module 111 may transmit the stored description information of the sub-device 200 to the first artificial intelligence model 121.

For example, the first module 111 may store description information A+B+C+D of a device #03. The first module 111 may transmit the description information A+B+C+D of the device #03 to the first artificial intelligence model 121.

The first artificial intelligence model 121 may be an artificial intelligence model clustering the description information. The first artificial intelligence model 121 may classify a plurality of sentences included in the description information into at least one cluster. At least one cluster may represent a group classified for each function. The first artificial intelligence model 121 may classify the plurality of sentences into at least one group (at least one cluster) classified for each function.

In case of receiving the description information of the sub-device 200, the first artificial intelligence model 121 may acquire cluster information of the description information of the sub-device 200 as output data. The cluster information may include at least one cluster, and each cluster may include at least one sentence included in the description information.

The first artificial intelligence model 121 may use the description information of the sub-device 200 that is received from the first module 111 as input data. The main device 100 may input (or apply) the description information of the sub-device 200 that is stored in the first module 111 to the first artificial intelligence model 121 as the input data. In addition, the main device 100 may acquire the cluster information corresponding to the description information as the output data from the first artificial intelligence model 121.

The first artificial intelligence model 121 may include an encoder 121-1 and a decoder 121-2. The encoder 121-1 may be a model extracting feature data of the text data (e.g., description information). The decoder 121-2 may be a model acquiring the cluster information of the text data (e.g., description information) based on the feature data. The feature data may be a feature vector extracted from the text data. The feature vectors may be a quantified value representing the text data.

The first artificial intelligence model 121 may input the description information acquired from the first module 111 to the encoder 121-1. In case of receiving the description information, the encoder 121-1 may acquire the feature data of the description information. The encoder 121-1 may acquire the plurality of sentences included in the description information and acquire the feature data of each of the acquired plurality of sentences. In addition, the encoder 121-1 may transmit the feature data (or the feature data of the description information) of each of the plurality of sentences to the decoder 121-2.

For example, the encoder 121-1 may acquire (or generate or output) feature data A'+B'+C'+D' of the description information in case of receiving the description information A+B+C+D of the device #03. The encoder 121-1 may transmit the feature data A'+B'+C'+D' of the description information to the decoder 121-2.

The decoder 121-2 may acquire the cluster information based on the feature data of the description information that is acquired from the encoder 121-1. The decoder 121-2 may acquire the cluster information corresponding to the description information as the output data by using the feature data of the description information. The feature data of the description information may include the feature data of each of the plurality of sentences included in the description information. The cluster information may be information acquired by classifying at least one sentence included in the description information in units of clusters classified for each function.

The decoder 121-2 may determine a type of each of the plurality of sentences based on the feature data of each of the plurality of classified sentences. The type may be classified into a first type (or a type representing that a sentence is the beginning of a function description) or a second type (or a type representing that a sentence is included in the middle of a function description).

The decoder 121-2 may determine each type of the plurality of sentences included in the description information. In addition, the plurality of sentences may be classified into at least one cluster based on the determined type.

For example, the decoder 121-2 may determine that a sentence A is the first type and a sentence B is the second type, a sentence C is the first type and a sentence D is the first type, based on type feature data A'+B'+C'+D' of the description information acquired by the encoder 121-1. The decoder

121-2 may identify that the sentences A and B are included in a first cluster C1, the sentence C is included in a second cluster C2, and the sentence D is included in a third cluster C3. The first cluster may represent the first function, the second cluster may represent the second function, and the third cluster may represent a third function.

As described above, the encoder 121-1 performs the operation of classifying the description information into the plurality of sentences and the operation of acquiring the feature data of each of the plurality of sentences. However, in another implementation example, the decoder 121-2 may perform the operation of classifying the description information into the plurality of sentences. The encoder 121-1 may include the feature data of the text data included in the description information. In addition, the encoder 121-1 may transmit the feature data of the description information to the decoder 121-2. The decoder 121-2 may classify the description information into the plurality of sentences based on the feature data. In addition, the decoder 121-2 may classify the plurality of sentences into at least one cluster.

In case of receiving the description information of the sub-device 200, the first artificial intelligence model 121 may acquire the cluster information of the description information of the sub-device 200 as the output data. A cluster included in the cluster information may include at least one sentence included in the description information. The first artificial intelligence model 121 may transmit the acquired cluster information of the description information to the second artificial intelligence model 122.

For example, in case of receiving the description information A+B+C+D of the device #03, the first artificial intelligence model 121 may acquire, as the output data, cluster information in which four sentences included in the description information of the device #03 are classified into three clusters of C1 (A' and B'), C2 (C'), and C3 (D'). The first artificial intelligence model 121 may transmit the cluster information C1 (A' and B'), C2 (C'), and C3 (D') to the second artificial intelligence model 122.

The second artificial intelligence model 122 may be an artificial intelligence model outputting the importance information for the function. In case of receiving the cluster information of the description information, the second artificial intelligence model 122 may acquire the importance information indicating functions related to the description information as the output data.

The second artificial intelligence model 122 may use the cluster information of the description information of the sub-device 200 that is received from the first artificial intelligence model 121 as the input data. The main device 100 may input (or apply) the cluster information of the description information acquired from the first artificial intelligence model 121 to the second artificial intelligence model 122 as the input data. In addition, the main device 100 may acquire the importance information indicating the function related to the description information as the output data from the second artificial intelligence model 122. The probability value information may include a value acquired by quantifying which function a content included in the description information indicates.

The probability value information may be used as the importance information.

The second artificial intelligence model 122 may include an encoder 122-1 and a decoder 122-2. The encoder 122-1 may be a model acquiring the feature data of the cluster information. The encoder 122-1 may be a pre-trained language model or a natural language learning model. The decoder 122-2 may be a model acquiring the probability value information indicating a function based on the feature data of the cluster information.

The second artificial intelligence model 122 may input the cluster information acquired from the first artificial intelligence model 121 to the encoder 122-1. In case of receiving the cluster information, the encoder 122-1 may acquire the feature data of the cluster information. The encoder 122-1 may transmit the feature data of the cluster information to the decoder 122-2.

For example, in case of receiving the cluster information C1 (A' and B'), C2 (C'), and C3 (D') of the device #03, the encoder 122-1 may acquire (or generate or output) feature data C1' (A' and B'), C2' (C'), and C3' (D') of the cluster information. The encoder 122-1 may transmit the feature data C1' (A' and B'), C2' (C'), and C3' (D') of the cluster information to the decoder 122-2.

The decoder 122-2 may include a feed forward neural network (FFNN) and softmax. In case of receiving the feature data of the cluster information, the decoder 122-2 may acquire probability value information indicating the function related to the description information based on the feed forward neural network (FFNN) and the softmax. The decoder 122-2 may have the probability value information acquired by quantifying which function each of at least one cluster included in the cluster information indicates.

The decoder 122-2 may select a function having the highest probability value among the functions representing the respective clusters. The decoder 122-2 may acquire the probability value representing a function as many as the number of clusters.

For example, in case of receiving the feature data C1' (A' and B'), C2' (C'), and C3' (D') of the cluster information, the decoder 122-2 may acquire the probability value information including a probability value p1 of a function f4 represented by the first cluster C1, a probability value p2 of a function f5 represented by the second cluster C2, a probability value p3 of a function f2 represented by the third cluster C3.

In case of receiving the cluster information of the description information, the second artificial intelligence model 122 may acquire the probability value information indicating the function related to the description information as the output data. The second artificial intelligence model 122 may transmit the probability value information to the second module 112.

For example, in case of receiving the cluster information of the description information C1 (A' and B'), C2 (C'), and C3 (D') of the device #03, the second artificial intelligence model 122 may acquire probability value information f4=p1, f5=p2, and f2=p3 representing the function related to the description information of the device #03 as output data. The second artificial intelligence model 122 may transmit the probability value information f4=p1, f5=p2, and f2=p3 to the second module 112.

The second module 112 may be a module generating the function information of the sub-device 200 that corresponds to the description information. The function of the sub-device 200 may be described as a representative function. In case of receiving the probability value information f4=p1, f5=p2, and f2=p3, the second module 112 may generate the function information of the sub-device 200.

The function information may be generated in various ways.

The second module 112 may generate the function information of the sub-device 200 by determining all functions included in the probability value information as the representative functions of the sub-device 200.

The second module 112 may generate the function information of the sub-device 200 by determining, as the representative function, a function having a predetermined threshold probability value or more among the functions included in the probability value information.

The second module 112 may generate the function information of the sub-device 200 by determining, as the representative function, a function having the highest probability value among the functions included in the probability value information.

The second module 112 may generate the function information of the sub-device 200 by determining, as the representative function, a function having has a probability value as high as a predetermined number (for example, 2) among the functions included in the probability value information.

The second module 112 may generate the function information of the sub-device 200 based on the probability value information received from the second artificial intelligence model 122.

The function information may include various data.

The function information may include data representing the function itself. For example, the second module 112 may determine the representative function of the sub-device 200 as f4, f5, and f2 based on the probability value information f4=p1, f5=p2, and f2=p3 received from the second artificial intelligence model 122. The function information of the sub-device 200 may include f4, f5, and f2.

The function information may include the data representing the function itself and a probability value of the function. For example, the function information of the sub-device 200 may include f4=p1, f5=p2, and f2=p3.

The function information may include the identification information indicating which device the function information relates to. For example, the function information may include identification information #03, representative functions f4, f5, and f2 and the probability values p1, p2, and p3.

The main device 100 may already identify the identification information indicating which device the function information relates to. Therefore, the first module 111, the first artificial intelligence model 121, the second artificial intelligence model 122, or the second module 112 may not necessarily transmit the identification information #03 together with the data. However, in some implementation examples, the model may always transmit the data together with (or included in) the identification information #03.

The second module 112 may transmit the generated function information to at least one of the third module 113 or the fourth module 114.

The third module 113 may be a module storing the function information of each device. The third module 113 may update existing function information of each device based on received information. In case of receiving the generated function information, the third module 113 may store the function information for the sub-device 200. The function information of each device may be stored in a first table.

For example, it may be assumed that the third module 113 stores information that representative functions of #01 (drying machine) are f3 and f4, and representative functions of #02 (washing machine) are f1 and f2. In case of receiving the function information f4, f5, and f2 of #03 (air dresser) from the second module 112, the third module 113 may update the existing function information of each device by adding information that the representative functions of #03 (air dresser) are f4, f5, and f2.

The fourth module 114 may be a module storing the device identification information for each function. The fourth module 114 may update existing device identification information for each function based on received information. In case of receiving the generated function information, the third module 113 may update the device identification information for each function. The device identification information for each function may be stored in a second table.

For example, it may be assumed that the fourth module 114 stores information that identification information of a device performing the first function f1 (washing) is #02, identification information of a device performing the second function f2 (sterilization) is #02, identification information of a device performing the third function f3 (drying) is #01, and identification information of a device performing the fourth function f4 (dust removal) is #01. In case of receiving the function information f4, f5, and f2 of #03 (air dresser) from the second module 112, the fourth module 114 may add #03 to the identification information of the device performing the second function f2 (sterilization), add #03 to the identification information of the device performing the fourth function f4 (dust removal), and add #03 to the identification information of the device performing the fifth function f5 (deodorization).

Figure 13:
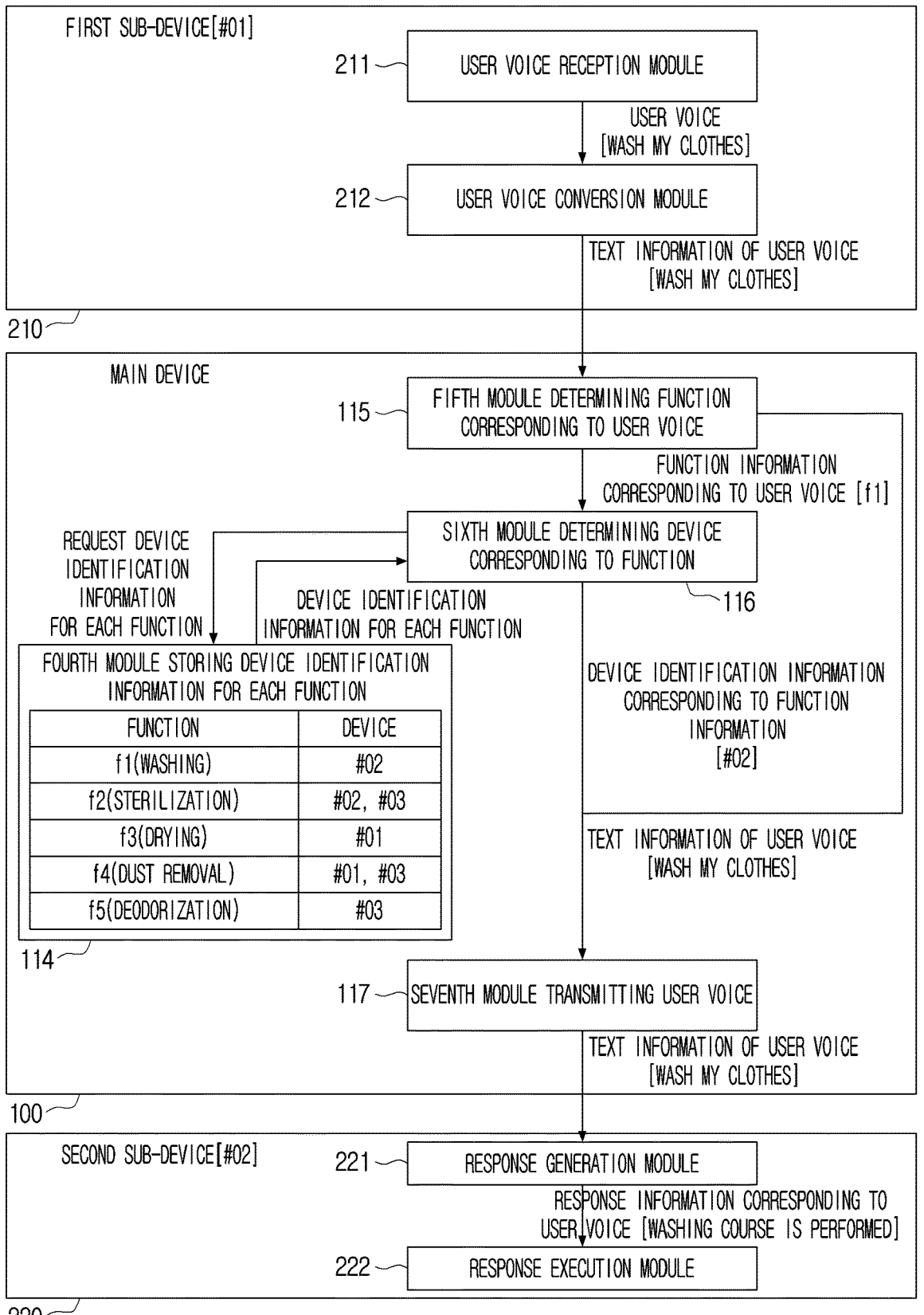
FIG. 13 is a view for explaining the main device determining a device to perform a response to a user voice according to an embodiment of the disclosure.

FIG. 13 is a view for explaining the main device 100 determining a device to perform the response to the user voice according to an embodiment of the disclosure.

Referring to FIG. 13, the main device 100 may perform the response to the user voice by transmitting the user voice received from the first sub-device 210 to the second sub-device 220.

The main device 100 may determine which device is to perform the response (or function) to the user voice received from the first sub-device 210. The user voice may be described as a user utterance or the user command.

The first sub-device 210 may include at least one of a user voice reception module 211 or a user voice conversion module 212.

The user voice reception module 211 may be a module receiving an analog audio signal. The user voice reception module 211 may include a microphone. The user voice reception module 211 may receive the user voice. The user voice reception module 211 may convert an analog voice signal corresponding to the user voice into a digital voice signal. In addition, the user voice reception module 211 may transmit the received user voice (or the digital voice signal) to the user voice conversion module 212.

The user voice conversion module 212 may receive the user voice (or data corresponding to the user voice) from the user voice reception module 211. The received user voice may be the digital voice signal.

The user voice conversion module 212 may convert the received user voice into text information. The user voice conversion module 212 may convert the user voice into the text information by using a speech to text (STT). The user voice conversion module 212 may transmit the text information of the converted user voice to the main device 100.

For example, it may be assumed that the user says "Wash my clothes." The user voice reception module 211 may transmit a digital voice signal corresponding to the user voice ("Wash my clothes") to the user voice conversion module 212. The user voice conversion module 212 may convert the digital voice signal corresponding to the user voice ("Wash my clothes") into text information ("Wash my clothes"). The user voice conversion module 212 may transmit the converted text information ("Wash my clothes") to the main device 100.

As described above, the user voice reception module 211 performs the operation of converting the analog voice signal corresponding to the user voice into the digital voice signal.

A variety of subjects may perform the operation of converting the analog voice signal into the digital voice signal.

The user voice conversion module 212 may perform the operation of converting the analog voice signal corresponding to the user voice into the digital voice signal. In this case, the user voice reception module 211 may transmit the analog voice signal corresponding to the user voice to the user voice conversion module 212.

The main device 100 may perform the operation of converting the analog voice signal corresponding to the user voice into the digital voice signal. In this case, the user voice reception module 211 may directly transmit the analog voice signal corresponding to the user voice to the main device 100.

The main device 100 may include at least one of the fourth module 114, a fifth module 115, a sixth module 116, or a seventh module 117. The description provides the description of the fourth module 114 with reference to FIG. 12, and thus omits redundant descriptions thereof.

The fifth module 115 may be a module determining a function corresponding to the user voice. The fifth module 115 may receive the text information of the user voice from the user voice conversion module 212 of the first sub-device 210. The fifth module 115 may determine (or identify) the function (or function information) corresponding to the user voice based on the received text information of the user voice. Here, the function information may include at least one of text data representing the function itself, identification information indicating the function, or the probability value representing the function.

The function corresponding to the text information may be determined in various ways.

The fifth module 115 may include a natural language understanding module. The fifth module 115 may acquire at least one of a category (or domain) of the user voice or an intention of the user voice by inputting the text information to the natural language understanding module. The fifth module 115 may determine the function corresponding to the user voice based on at least one of the category of the user voice or the intention of the user voice.

The fifth module 115 may determine the function corresponding to the user voice based on whether the text information and a predetermined keyword match each other. Here, the predetermined keyword may be a word representing the function. The fifth module 115 may determine whether the text information includes a keyword representing a specific function. In case that the text information includes a first keyword representing the first function, the fifth module 115 may identify the first function corresponding to the first keyword as the function corresponding to the user voice.

The fifth module 115 may determine the function corresponding to the user voice based on similarity between the text information and the predetermined keyword. The fifth module 115 may compare a word included in the text information with the predetermined keyword. The fifth module 115 may acquire the similarity between the word included in the text information and the predetermined keyword. In addition, in case of identifying the first keyword having the similarity equal to or greater than a threshold value, the fifth module 115 may identify the first function corresponding to the identified first keyword as the function corresponding to the user voice.

A variety of functions may be included in the function information.

The function information may include one function. The fifth module 115 may determine a specific function (or one function) based on the text information of the user voice. In addition, the fifth module 115 may transmit the determined specific function (or one function) to the sixth module 116.

The function information may include at least one function. The function information may include the plurality of functions used to perform the user voice. The fifth module 115 may determine that the plurality of functions are required to perform the user voice based on the text information of the user voice. In addition, the fifth module 115 may generate the function information including the plurality of functions. In addition, the fifth module 115 may transmit the function information to the sixth module 116.

The fifth module 115 may analyze the user voice to determine which function the user wants to perform. After the specific function represented by the user voice is determined, the fifth module 115 may transmit the function information including the determined function to the sixth module 116.

For example, the fifth module 115 may receive the text information ("Wash my clothes") from the first sub-device 210. The fifth module 115 may acquire function information f1 (washing) corresponding to the text information ("Wash my clothes"). In addition, the fifth module 115 may transmit the function information to the sixth module 116.

The sixth module 116 may be a module determining a device corresponding to the function. The sixth module 116 may receive function information including the function corresponding to the user voice from the fifth module 115. The sixth module 116 may acquire device identification information corresponding to the received function information. The sixth module 116 may determine which device may perform the received function. In case of receiving the function information from the fifth module 115, the sixth module 116 may request the device identification information for each function from the fourth module 114. In addition, the sixth module 116 may receive the device identification information for each function from the fourth module 114. The sixth module 116 may acquire the device identification information corresponding to the function information (or function) received from the received device identification information for each function.

The sixth module 116 may determine the device to perform a function received from the received device identification information for each function, and acquire the determined device identification information. The device identification information may be described as the device identification information or identification information of the device. The sixth module 116 may transmit the acquired device identification information to the seventh module 117.

For example, the sixth module 116 may receive the function information f1 (washing) from the fifth module 115. The sixth module 116 may acquire device identification information #02 corresponding to the function information f1 (washing) in the device identification information for each function received from the fourth module 114. In addition, the sixth module 116 may transmit the device identification information #02 to the seventh module 117.

The seventh module 117 may be a module transmitting the user voice. The seventh module 117 may transmit the text information of the user voice to the second sub-device 220 based on the device identification information received from the sixth module 116.

The seventh module 117 may acquire the text information of the user voice transmitted by the first sub-device 210. In addition, the seventh module 117 may transmit the text information of the acquired user voice to the second sub-device 220.

The seventh module 117 may transmit a command for generating a response (or a response generation command) together with the text information to the second sub-device 220. In case of receiving the response generation command, the second sub-device 220 may generate a response corresponding to the received text information.

A variety of subjects may transmit the text information of the user voice to the seventh module 117.

The seventh module 117 may receive the text information of the user voice from the fifth module 115. The seventh module 117 may transmit the text information of the user voice that is received from the fifth module 115 to the second sub-device 220 corresponding to the device identification information received from the sixth module 116.

The seventh module 117 may receive the text information of the user voice from the first sub-device 210. The seventh module 117 may transmit the text information of the user voice that is received from the first sub-device 210 to the second sub-device 220 corresponding to the device identification information received from the sixth module 116.

For example, the seventh module 117 may receive the device identification information #02 corresponding to the function information f1 (washing) from the sixth module 116. In addition, the seventh module 117 may receive the text information ("Wash my clothes") from the fifth module 115. The seventh module 117 may transmit the text information ("Wash my clothes") to the second sub-device 220 corresponding to the identification information #02. The second sub-device 220 may be the washing machine, and the identification information #02 may be identification information of the washing machine.

The main device 100 may transmit the text information to the second sub-device 220 in various ways.

The main device 100 may transmit only the text information to the second sub-device 220.

The main device 100 may transmit the text information and the identification information to the second sub-device 220. The main device 100 may transmit the identification information together with the text information to the second sub-device 220. The second sub-device 220 may determine whether the received identification information matches its own identification information. In case that the received identification information matches its own identification information, the second sub-device 220 may generate the response to (or response information corresponding to) the text information.

The second sub-device 220 may be a device corresponding to the identification information determined in the sixth module 116. The second sub-device 220 may include at least one of a response generation module 221 or a response execution module 222.

The second sub-device 220 may receive the text information from the main device 100. The response generation module 221 of the second sub-device 220 may receive the text information of the user voice from the seventh module 117 of the main device 100. In addition, the response generation module 221 may generate the response (or the response information) based on the text information of the user voice. The response generation module 221 may generate the response corresponding to the received text information. In addition, the response generation module 221 may transmit the generated response information to the response execution module 222.

The response generation module 221 may include the natural language understanding module and a dialog manager module. The response generation module 221 may acquire at least one of the category (or domain) of the user voice or the intention of the user voice by inputting the received text information to the natural language understanding module. The response generation module 221 may transmit at least one of the category (or domain) of the user voice or the intention of the user voice, acquired from the natural language understanding module, to the dialogue manager module. The response generation module 221 may acquire response information corresponding to the user voice by inputting at least one of the category (or domain) of the user voice or the intention of the user voice to the dialog manager module.

The response information may be information on a control operation of a device performed based on the text information. The response information may include at least one of the text information indicating the response, image information, and a control command related to response execution.

For example, the response generation module 221 may generate the response information (or information related to performing a washing course) based on the text information ("Wash my clothes"). The response generation module 221 may generate at least one of text information indicating a response ("The washing course is performed"), the image information (or an icon related to the washing course), or a control command related to the response execution (or a control command to perform the washing course). Here, the response generation module 221 may transmit the generated response information (or the control command related to the washing course) to the response execution module 222.

The response execution module 222 may be a module performing an operation corresponding to the user voice based on the response information. The response execution module 222 may receive the response information from the response generation module 221. In addition, the response execution module 222 may perform a control operation based on the response information.

For example, in case of receiving the response information (or the control command related to the washing course) from the response generation module 221, the response execution module 222 may perform the control operation (or the washing course).

As described above, the first sub-device 210 includes at least one of the user voice reception module 211 or the user voice conversion module 212. In addition, the first sub-device 210 may further include at least one of the response generation module or the response execution module.

As described above, the second sub-device 220 includes at least one of the response generation module 221 or the response execution module 222. In addition, the second sub-device 220 may further include at least one of the user voice reception module or the user voice conversion module.

The fifth module 115 to the sixth module 116 may include an artificial intelligence model, and use the artificial intelligence model for the operation of acquiring (or generating) the function information or the identification information.

FIG. 13 shows that in case of receiving the user voice from the first sub-device 210, the main device 100 transmits the user voice to the second sub-device 220. In some implementation examples, in case of receiving the user voice from the first sub-device 210, the main device 100 may transmit the user voice to the first sub-device 210 again. For example, in case that the function corresponding to the user voice is f3 (drying), the main device 100 may transmit the text information of the user voice to the first sub-device 210 again. In some implementation examples, the main device 100 may transmit the command to generate the response (or the response generation command) to the first sub-device 210. In case of receiving the response generation command from the main device 100, the first sub-device 210 may generate the response based on the text information of the user voice already acquired.

As described above, the sub-device provides the response to the user voice. In some implementation examples, in case that the main device 100 may perform a specific function, the response to the user voice may be provided from the main device 100. In this case, the main device 100 may not need to transmit the text information of the user voice to another sub-device.

Figure 14:
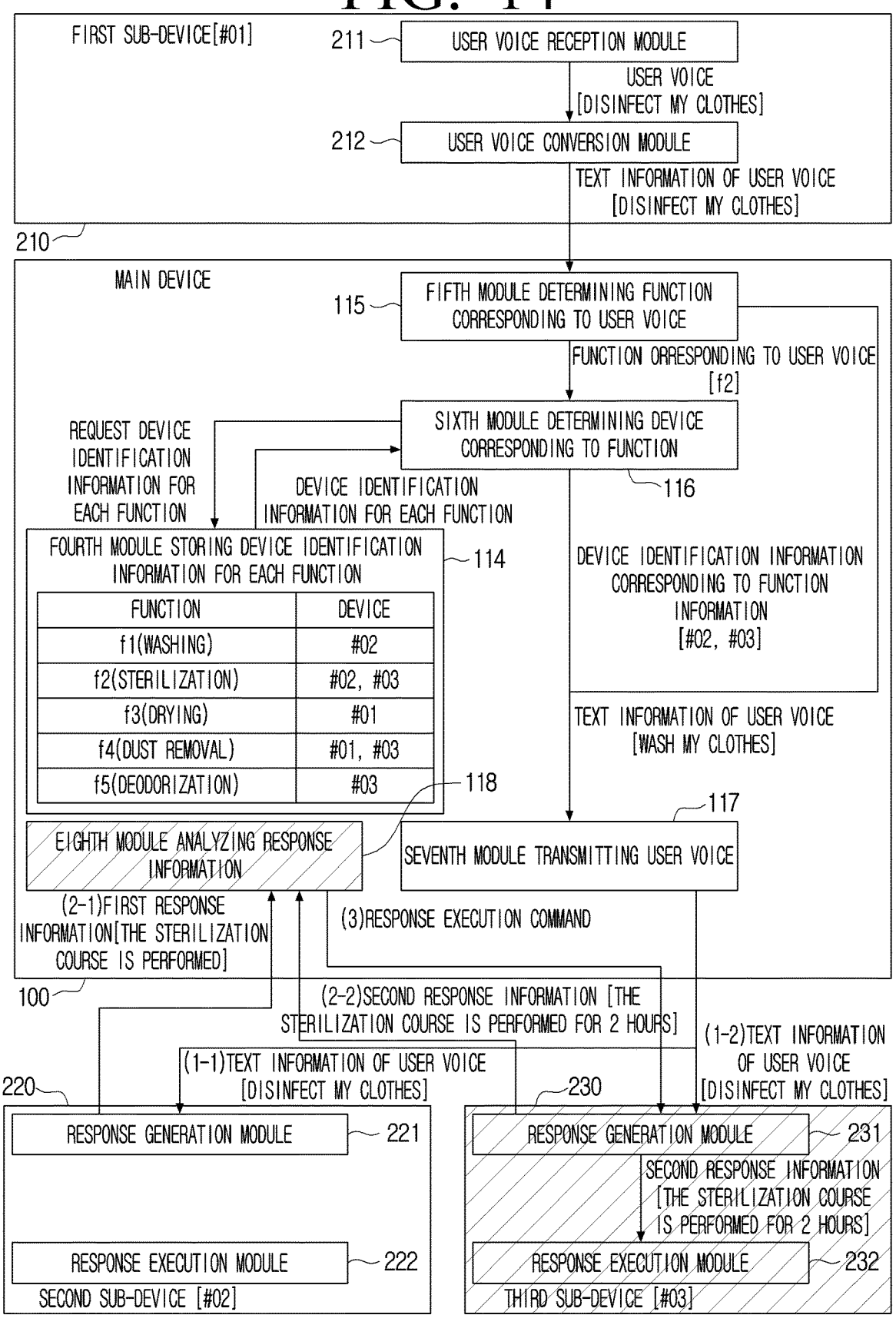
FIG. 14 is a view for explaining the main device determining the device to perform a response to a user voice by calculating a response score according to an embodiment of the disclosure.

FIG. 14 is a view for explaining the main device 100 determining a device performing the response to the user voice by calculating the response score according to an embodiment of the disclosure.

Referring to FIG. 14, the main device 100 may perform the response to the user voice by transmitting the user voice received from the first sub-device 210 to a third sub-device 230.

The user voice reception module 211 or the user voice conversion module 212 that is included in the first sub-device 210 have been described above, with reference to FIG. 13, and thus redundant descriptions thereof are omitted.

The fourth module 114, the fifth module 115, the sixth module 116 or the seventh module 117 has been described above, with reference to FIG. 13, and thus a redundant descriptions are omitted. In addition, the main device 100 may further include an eighth module 118.

The response generation module 221 or the response execution module 222 that is included in the second sub-device 220 have been described above with reference to FIG. 13, and thus redundant descriptions thereof are omitted.

The third sub-device 230 may include at least one of a response generation module 231 or a response execution module 232. The response generation module 231 or the response execution module 232 may correspond to the response generation module 221 or response execution module 222 of the second sub-device 220, and the description thus omits redundant descriptions thereof.

For example, it may be assumed that the user utters "Disinfect my clothes." The user voice reception module 211 may transmit a digital voice signal corresponding to the user voice ("Disinfect my clothes") to the user voice conversion module 212. The user voice conversion module 212 may convert the digital voice signal corresponding to the user voice ("Disinfect my clothes") into text information ("Disinfect my clothes"). The user voice conversion module 212 may transmit the converted text information ("Disinfect my clothes") to the main device 100.

For example, the fifth module 115 may receive the text information ("Disinfect my clothes") from the first sub-device 210. The fifth module 115 may acquire function information f2 (sterilization) corresponding to the text information ("Disinfect my clothes"). In addition, the fifth module 115 may transmit the function information to the sixth module 116.

For example, the sixth module 116 may receive the function information f2 (sterilization) from the fifth module

115. The sixth module 116 may acquire device identification information #02 and #03 corresponding to the function information f2 (sterilization) in the device identification information for each function received from the fourth module 114. In addition, the sixth module 116 may transmit the device identification information #02 and #03 to the seventh module 117.

For example, the seventh module 117 may receive the device identification information #02 and #03 corresponding to the function information f2 (sterilization) from the sixth module 116. In addition, the seventh module 117 may receive the text information ("Disinfect my clothes") from the fifth module 115. The seventh module 117 may transmit the text information ("Disinfect my clothes") to the second sub-device 220 and third sub-device 230, corresponding to the identification information #02 and #03. The second sub-device 220 may be the washing machine, and the identification information #02 may be identification information of the washing machine. The third sub-device 230 may be an air dresser, and the identification information #03 may be identification information of the air dresser.

As described above, the seventh module 117 transmits the text information of the user voice to the second sub-device 220. In some implementation examples, the seventh module 117 may transmit the analog signal of the user voice or the digital signal of the user voice to the second sub-device 220.

The second sub-device 220 may receive the text information from the main device 100. The response generation module 221 of the second sub-device 220 may receive the text information from the seventh module 117 of the main device 100. In addition, the response generation module 221 may generate first response information based on the received text information. In addition, the response generation module 221 may transmit the generated first response information to the eighth module 118 of the main device 100.

For example, the response generation module 221 of the second sub-device 220 may generate the response information (or information related to performing a sterilization course) based on the text information ("Disinfect my clothes"). The response generation module 221 may generate text information indicating a response ("The sterilization course is performed") as the first response information. In addition, the response generation module 221 may transmit the first response information ("The sterilization course is performed") to the eighth module 118 of the main device 100.

The third sub-device 230 may receive the text information from the main device 100. The response generation module 231 of the third sub-device 230 may receive the text information from the seventh module 117 of the main device 100. In addition, the response generation module 231 may generate second response information based on the received text information. In addition, the response generation module 231 may transmit the generated second response information to the eighth module 118 of the main device 100.

For example, the response generation module 231 of the third sub-device 230 may generate the response information (or information related to performing the sterilization course) based on the text information ("Disinfect my clothes"). The response generation module 231 may generate text information indicating a response ("A sterilization course is performed for 2 hours") as the response information. In addition, the response generation module 231 may transmit the response information ("The sterilization course is performed for 2 hours") to the eighth module 118 of the main device 100.

The eighth module 118 may be a module analyzing the response information received from the sub-device. The eighth module 118 may receive the first response information from the second sub-device 220, and receive the second response information from the third sub-device 230.

In case of receiving the first response information and the second response information, the eighth module 118 may determine (or select) one sub-device among the plurality of sub-devices. The eighth module 118 may determine one response information to be provided to the user by comparing the first response information and the second response information, corresponding to the user voice, with each other. In addition, the eighth module 118 may determine a sub-device corresponding to one determined response information. The eighth module 118 may transmit a response execution command to the determined sub-device.

The eighth module 118 may determine one sub-device to perform the response by calculating the response score for each of the plurality of response information. The eighth module 118 may calculate the response score based on at least one of an informativeness score, a content score, or a processing time score. The eighth module 118 may acquire a first response score corresponding to the first response information and a second response score corresponding to the second response information.

The informativeness score may be a score representing how much information is included in the response information. The more words included in the response information, the higher the informativeness score. In addition, the more predetermined keywords included in the response information, the higher the informativeness score. Here, the predetermined keyword may be a word related to the function or a word related to the function description, and may be a pre-stored word based on a user setting.

Various predetermined keywords may exist.

The predetermined keyword may be a word predetermined by the user in relation to the function description. For example, the keywords may include 'washing', 'sterilization', 'drying', 'dust removal', 'deodorization', and the like.

The predetermined keyword may be a word related to the function corresponding to the user voice. The predetermined keyword may be a word corresponding to the function determined by the fifth module 115. For example, the keyword may include 'washing'.

The content score may be a score representing which content type is included in the response information. The content type may indicate text, image, video, or the like. The more images included in the response information, the higher the content score. In addition, the more videos included in the response information, the higher the content score.

The processing time score may indicate whether the response information is generated or information indicating the time required to generate the response information. In case that the response information is generated, the processing time score may be large. In addition, the shorter the time required to generate the response information, the higher the processing time score.

The eighth module 118 may calculate the response score based on at least one of the informativeness score, the content score, or the processing time score. In addition, the eighth module 118 may determine a sub-device to perform a final response based on the response score. The eighth module 118 may determine response information with a higher score among the first response score and the second response score, and generate the response execution command (or the response control command) for the sub-device transmitting the determined response information to provide the response.

For example, the eighth module 118 may receive the first response information ("The sterilization course is performed") from the second sub-device 220 and the second response information ("The sterilization course is performed for 2 hours") from the third sub-device 230. In addition, the eighth module 118 may acquire the first response score corresponding to the first response information and acquire the second response score corresponding to the second response information. It may be assumed that the second response score is greater than the first response score because an explanatory word "for 2 hours" is added to the second response information. In case that the second response score is greater than the first response score, the eighth module 118 may determine that the third sub-device 230 generating the second response information corresponding to the second response score provides the response. The eighth module 118 may generate the response execution command for the third sub-device 230 to provide the response to the user. In addition, the eighth module 118 may transmit the response execution command to the third sub-device 230.

The third sub-device 230 may receive the response execution command from the main device 100. The response generation module 231 of the third sub-device 230 may receive the response execution command from the eighth module 118 of the main device 100. In case of receiving the response execution command, the response generation module 231 may transmit the generated second response information (or the response information corresponding to the user voice) to the response execution module 232.

For example, in case of receiving the response execution command from the eighth module 118, the response generation module 231 may transmit the second response information ("The sterilization course is performed for 2 hours") already generated to the response execution module 232. In case of receiving the second response information ("The sterilization course is performed for 2 hours") from the response generation module 231, the response execution module 232 may perform the control operation (or the sterilization course).

As described above, the third sub-device 230 includes at least one of the response generation module 231 or the response execution module 232. In addition, the third sub-device 230 may further include at least one of the user voice reception module or the user voice conversion module.

FIG. 14 shows that in case of receiving the user voice from the first sub-device 210, the main device 100 transmits the user voice to the second sub-device 220 or the third sub-device 230. In some implementation examples, in case of receiving the user voice from the first sub-device 210, the main device 100 may transmit the user voice to the first sub-device 210 again. For example, in case that the function corresponding to the user voice is f4 (dust removal), the main device 100 may transmit the text information of the user voice to the first sub-device 210 and the third sub-device 230.

FIG. 15 is a view for explaining the function and importance of each of a plurality of devices according to an embodiment of the disclosure.

Referring to FIG. 15, tables 1510, 1520, and 1530 show the importance of each function of the plurality of devices. The embodiments illustrated in FIGS. 15 and 16 show devices each implemented in a form different from that of FIG. 4 or 5.

The table 1510 shows function information of a first device (or the drying machine) and importance of the function information. The first device (or the drying machine) may perform the drying function f3 and the dust removal function f4. In addition, the first device (or the drying machine) may have 0.9 as importance of the drying function f3 and 0.6 as importance of the dust removal function f4.

The table 1520 shows the function information and importance of the function information of the second device (or the washing machine). The second device (or the washing machine) may perform the washing function f1 and the sterilization function f2. In addition, the second device (or the washing machine) may have 0.9 as importance of the washing function f1 and 0.5 as importance of the sterilization function f2.

The table 1530 shows the function information and importance of the function information of the third device (or the air dresser). The third device (or the air dresser) may perform the dust removal function f4, the deodorization function f5, and the sterilization function f2. In addition, the third device (or the air dresser) may have 0.8 as the importance of the dust removal function f4, 0.7 as importance of the deodorization function f5, and 0.6 as the importance of the sterilization function f2.

FIG. 16 is a view for explaining a plurality of devices for each function and their importance according to an embodiment of the disclosure.

Referring to FIG. 16, tables 1610, 1620, 1630, 1640, and 1650 show importance of each device that is classified for each function.

The table 1610 shows a device to perform the first function (or the washing) and importance of the first function (or the washing) of the device. The device to perform the first function (or the washing) may be the washing machine. The washing machine may have 0.7 as the importance of the first function (or the washing).

The table 1620 shows a device to perform the second function (or the sterilization) and importance of the second function (or the sterilization) of the device. The devices to perform the second function (or the sterilization) may be the air dresser and the washing machine. The air dresser may have 0.6 as the importance of the second function (or the sterilization). In addition, the washing machine may have 0.5 as the importance of the second function (or the sterilization).

The table 1630 shows a device to perform the third function (or the drying) and importance of the third function (or the drying) of the device. The device to perform the third function (or the drying) may be the drying machine. The drying machine may have 0.9 as the importance of the third function (or the drying).

The table 1640 shows a device to perform the fourth function (or the dust removal) and importance of the fourth function (or the dust removal) of the device. The devices to perform the fourth function (or the dust removal) may be the air dresser and the drying machine. The air dresser may have 0.8 as the importance of the fourth function (or the dust removal). In addition, the drying machine may have 0.6 as the importance of the fourth function (or the dust removal).

The table 1650 shows a device to perform the fifth function (or the deodorization) and importance of the fifth function (or the deodorization) of the device. The device to perform the fifth function (or the deodorization) may be the air dresser. The air dresser may have 0.7 as the importance of the fifth function (or the deodorization).

Figure 17:
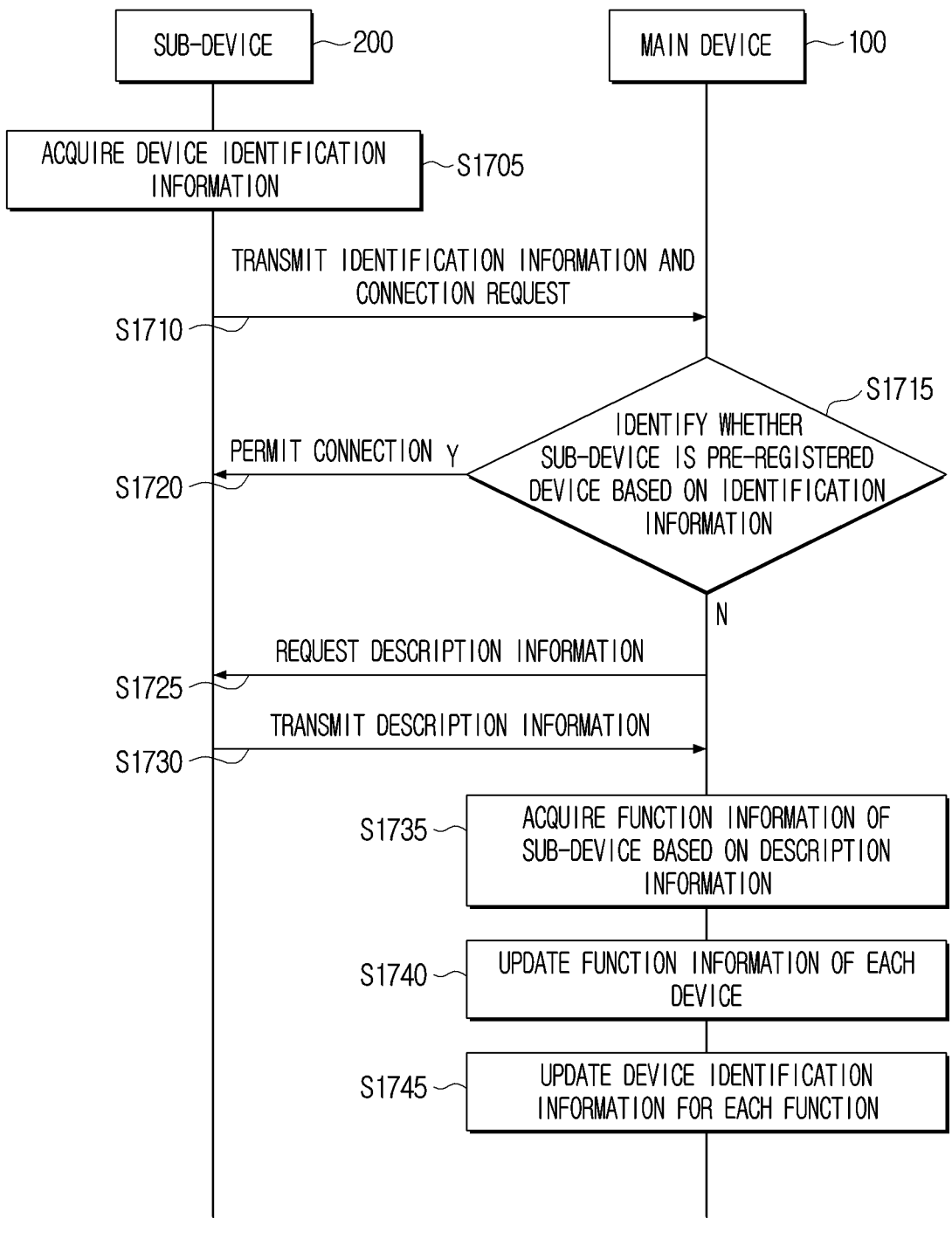
FIG. 17 is a flowchart for explaining an operation of updating function information of each device and device identification information for each function according to an embodiment of the disclosure.

FIG. 17 is a flowchart for explaining an operation of updating the function information of each device and the device identification information for each function according to an embodiment of the disclosure.

Referring to FIG. 17, the main device 100 may be connected to the sub-device 200. The sub-device 200 may include at least one device. The sub-device 200 may include at least one of the first sub-device 210 or the second sub-device 220.

The sub-device 200 may acquire the device identification information at operation S1705. The sub-device 200 may transmit the identification information and the connection request to the main device 100 at operation S1710.

The main device 100 may receive the identification information and the connection request from the sub-device 200. The main device 100 may identify whether the sub-device 200 is a pre-registered device based on the received identification information at operation S1715.

In case that the sub-device 200 is the pre-registered device at operation S1715-Y, the main device 100 may transmit a signal permitting the connection to the sub-device 200 at operation S1720.

In case that the sub-device 200 is not the pre-registered device at operation S1715-N, the main device 100 may transmit a signal requesting the description information to the sub-device 200 at operation S1725.

The sub-device 200 may receive the signal requesting the description information from the main device 100. The sub-device 200 may transmit the description information to the main device 100 in response to the signal requesting the description information at operation S1730.

The main device 100 may receive the description information from the sub-device 200. The main device 100 may acquire the function information of the sub-device 200 based on the description information at operation S1735.

The main device 100 may update the function information of each device based on the acquired function information of the sub-device 200 at operation S1740.

The main device 100 may update the device identification information for each function based on the acquired function information of the sub-device 200 at operation S1745.

The main device 100 installed in a private house may include at least one processor acquiring the function information of each of the plurality of devices based on the communication interface communicating with the plurality of sub-devices, the memory, and the description information of the plurality of sub-devices, storing the device identification information of each function in the memory based on the function information of each of the plurality of sub-devices, acquiring the text information of the user voice, determining the function corresponding to the user voice based on the text information of the user voice, acquiring the identification information of at least one sub-device that corresponds to the function based on the device identification information for each function stored in the memory, and transmitting the text information of the user voice to at least one sub-device among the plurality of sub-devices based on the identification information of at least one sub-device through a communication interface.

The main device 100 may acquire the description information of each of the plurality of sub-devices, acquire at least one sentence-specific feature data included in the description information, acquire the cluster information of the description information based on at least one sentence-specific feature data, and acquire the function information of each of the plurality of sub-devices based on the cluster information.

The main device 100 may acquire the plurality of sentences included in the description information, acquire the feature data of each of at least one sentence, acquire the cluster information by classifying each of the at least one sentence into at least one cluster based on the feature data, and at least one cluster may be a unit representing a functional group.

The main device 100 may acquire the category of the user voice and the intension of the user voice based on the text information, and determine the function corresponding to the user voice based on the category of the user voice and the intention of the user voice.

The sub-device 200 installed in a private house may include at least one processor receiving the user voice through the communication interface communicating with the microphone and the main device, the memory, and the microphone, acquiring the text information of the user voice, transmitting the text information to the main device 100 through the communication interface, generating the response corresponding to the text information in case of receiving the response generation command from the main device 100 through the communication interface, and providing the generated response.

The text information may be information used to determine the function corresponding to the user voice, and the response generation command may be a command generated based on the function determined based on the device identification information of each function and the text information, stored in the main device 100.

Figure 18:
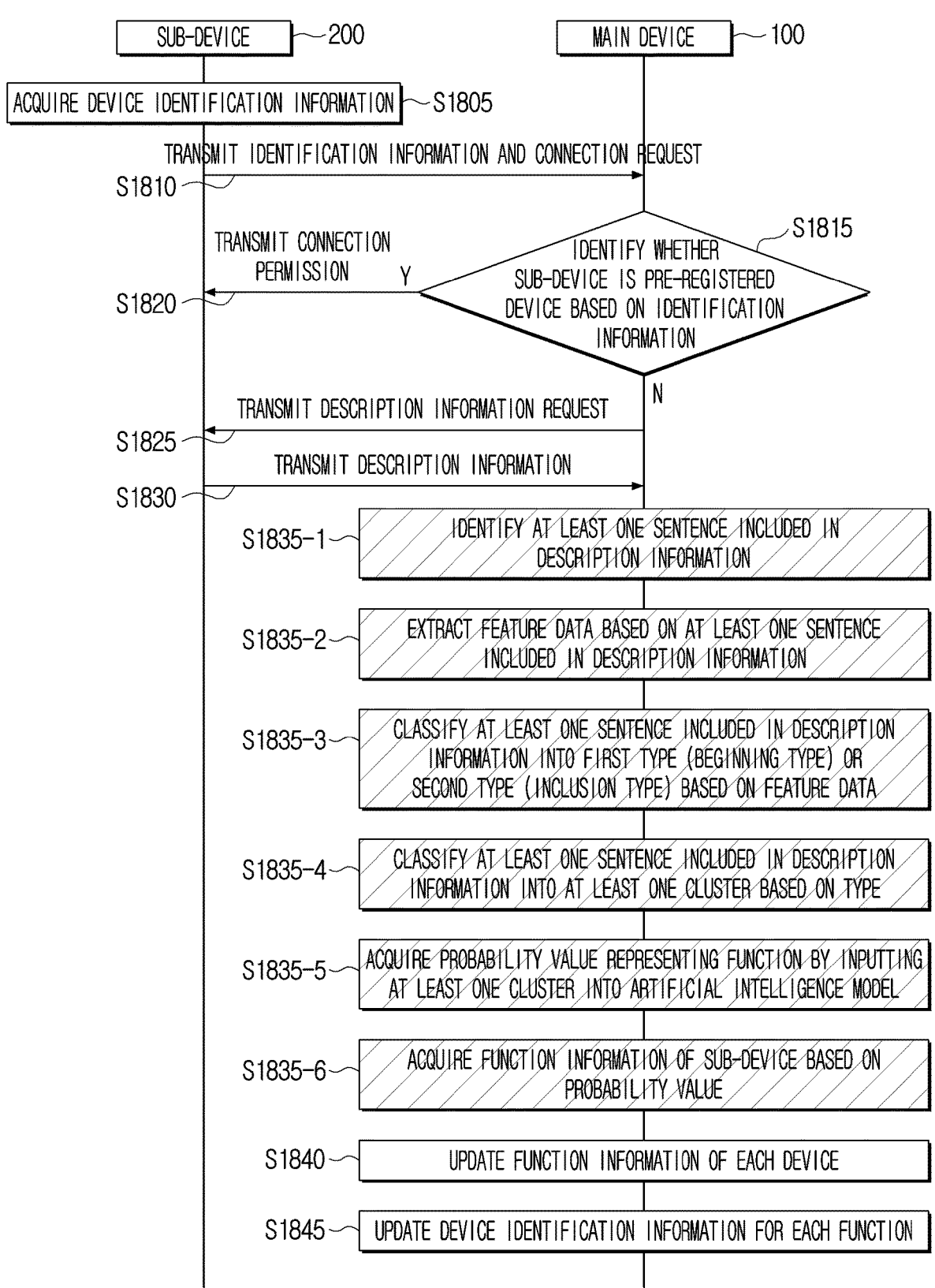
FIG. 18 is a flowchart for explaining an operation of updating function information of each device and device identification information for each function according to an embodiment of the disclosure.

FIG. 18 is a flowchart for explaining an operation of updating the function information of each device and the device identification information for each function according to an embodiment of the disclosure.

Operations S1805, S1810, S1815, S1820, S1825, S1830, S1840 and S1845 of FIG. 18 may correspond to the operations S1705, S1710, S1715, S1720, S1725, S1730, S1740 and S1745 of FIG. 17. The description thus omits redundant descriptions thereof.

After receiving the description information, the main device 100 may identify at least one sentence included in the description information at operation S1835-1. The main device 100 may extract the feature data based on at least one sentence included in the description information at operation S1835-2.

The main device 100 may classify at least one sentence included in the description information into a first type (or a beginning type) or a second type (or an inclusion type) based on the feature data at operation S1835-3. The beginning type may be a type in which the sentence is positioned at the beginning of an entire paragraph. The inclusion type may be a type in which the sentence is positioned in the middle of the entire paragraph, or a type in which the sentence is not positioned at the beginning of the paragraph. The inclusion type may be described as a non-beginning type.

The main device 100 may classify at least one sentence included in the description information into at least one cluster based on the determined type at operation S1835-4. The main device 100 may acquire the probability value representing the function by inputting at least one cluster into the artificial intelligence model at operation S1835-5. The main device 100 may acquire the function information of the sub-device 200 based on the probability value at operation S1835-6.

Various embodiments of acquiring the function information based on the cluster are described below with reference to FIGS. 24 to 27.

Figure 19:
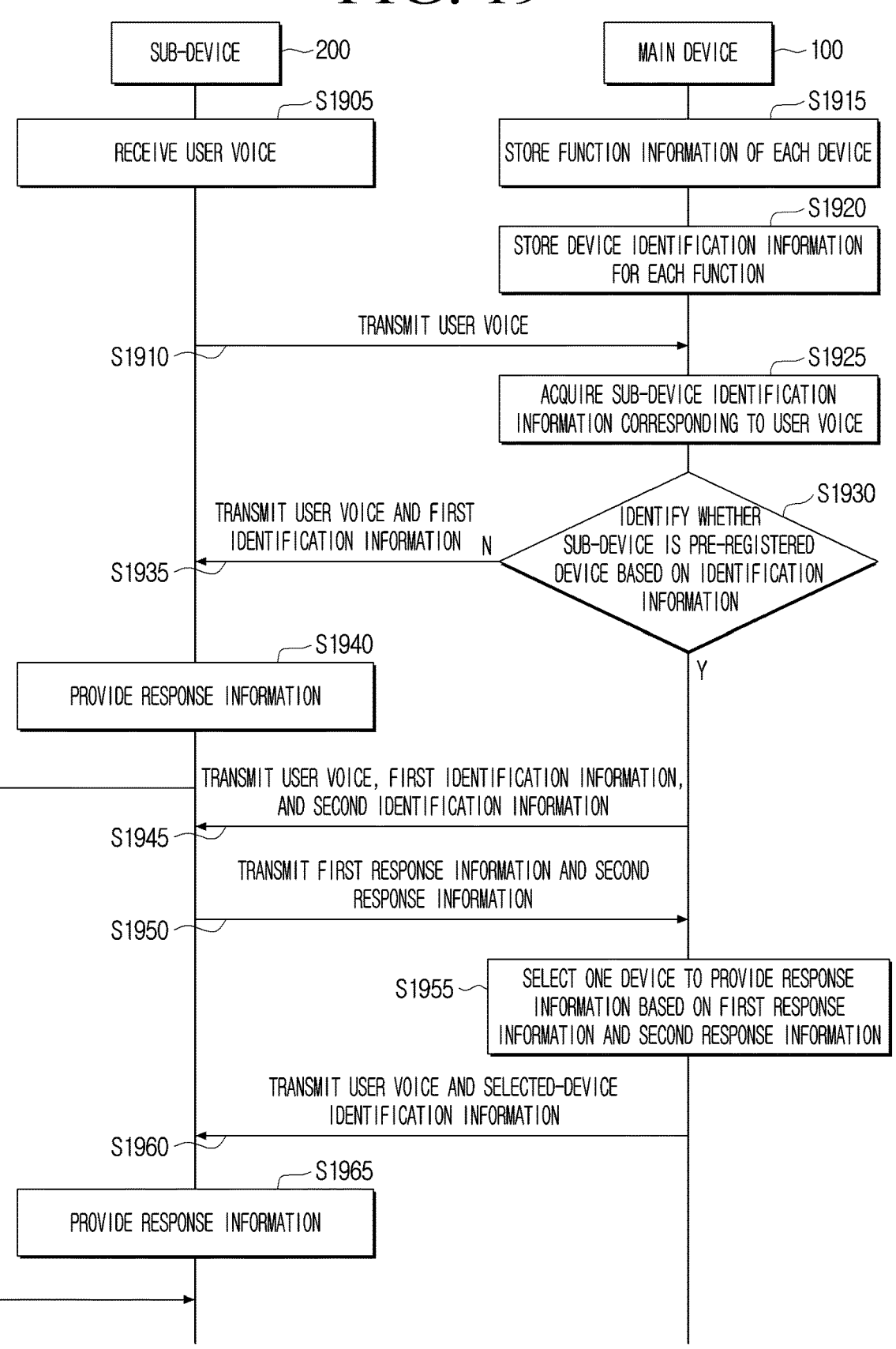
FIG. 19 is a flowchart for explaining an operation of selecting a device providing the response information according to an embodiment of the disclosure.

FIG. 19 is a flowchart for explaining an operation of selecting a device providing the response information according to an embodiment of the disclosure.

Referring to FIG. 19, the sub-device 200 may receive the user voice at operation S1905. In addition, the sub-device 200 may transmit the user voice to the main device 100 at operation S1910. The user voice may include a control command for performing a function of a specific sub-device.

The main device 100 may store the function information of each device at operation S1915. The main device 100 may store the device identification information for each function at operation S1920.

The main device 100 may receive the user voice from the sub-device 200. The main device 100 may acquire the device identification information corresponding to the received user voice at operation S1925. The main device 100 may analyze the user voice and identify a device to be controlled through the user voice. In addition, the main device 100 may acquire the identified device identification information.

The main device 100 may identify whether the plurality of sub-devices 200 correspond to the user voice at operation S1930.

In case that the plurality of sub-devices 200 corresponding to the user voice do not exist at operation S1930-N, the main device 100 may transmit the user voice and first identification information to the sub-device 200 at operation S1935. The device identification information corresponding to the user voice may be described as the first identification information.

The sub-device 200 may receive the user voice and the first identification information from the main device 100. The sub-device 200 may provide the response information based on the received first identification information and user voice at operation S1940. The response information may include the response to the user voice.

In case that the plurality of sub-devices 200 correspond to the user voice at operation S1930-Y, the main device 100 may transmit the user voice, the first identification information, and second identification information to the sub-device 200 at operation S1945. The identification information of the plurality of devices corresponding to the user voice may be described as the first identification information and the second identification information.

The sub-device 200 may receive the user voice, the first identification information, and the second identification information from the main device 100. The sub-device 200 may acquire the first response information through a device corresponding to the first identification information. The sub-device 200 may acquire the second response information through a device corresponding to the second identification information. The sub-device 200 may transmit the first response information and the second response information to the main device 100 at operation S1950.

The main device 100 may receive the first response information and the second response information from the sub-device 200.

The main device 100 may select one device (or one sub-device) to provide the response information based on the first response information and the second response information at operation S1955. The main device 100 may transmit the user voice and the selected-device identification information to the sub-device 200 at operation S1960.

The sub-device 200 may receive the user voice and the selected-device identification information from the main device 100. The sub-device 200 may provide the response information based on the selected-device identification information and the user voice at operation S1965. The sub-device 200 may acquire the response information through a device corresponding to the selected-device identification information. The sub-device 200 may provide the response information.

Figure 20:
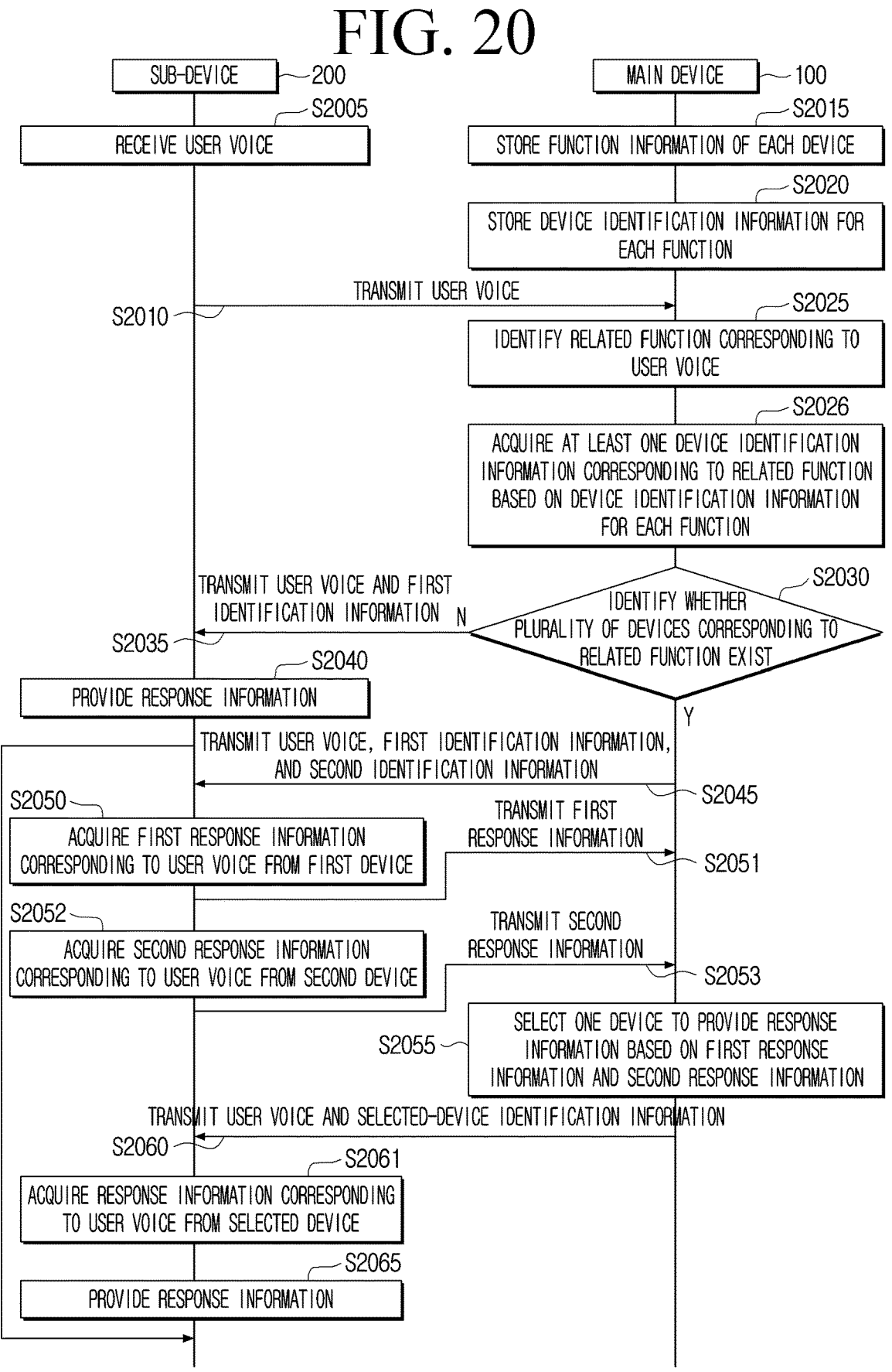
FIG. 20 is a flowchart for explaining an operation of selecting a device providing the response information according to an embodiment of the disclosure.

FIG. 20 is a flowchart for explaining an operation of selecting the device providing the response information according to an embodiment of the disclosure.

Operations S2005, S2010, S2015, S2020, S2035, S2040, S2045, S2055, S2060, and S2065 of FIG. 20 may correspond to the operations S1905, S1910, S1915, S1920, S1935, S1940, S1945, S1955, S1960, and S1965 of FIG. 19. The description thus omits redundant descriptions thereof.

After receiving the user voice from the sub-device 200, the main device 100 may identify a related function corresponding to the user voice at operation S2025.

The main device 100 may acquire at least one device identification information corresponding to the related function based on the device identification information for each function at operation S2026.

The main device 100 may identify whether a plurality of related devices corresponding to the function exist at operation S2030.

In case that the plurality of related devices corresponding to the function do not exist at operation S2030-N, the main device 100 may perform an operation S2035 and the sub-device 200 may perform an operation S2040.

In case that the plurality of related devices correspond to the function at operation S2030-Y, the main device 100 may perform an operation S2045.

The sub-device 200 may acquire the first response information corresponding to the user voice from the first device corresponding to the first identification information at operation S2050. The sub-device 200 may transmit the first response information to the main device 100 at operation S2051.

The sub-device 200 may acquire the second response information corresponding to the user voice from the second device corresponding to the second identification information at operation S2052. The sub-device 200 may transmit the second response information to the main device 100 at operation S2053.

After receiving the first response information and the second response information, the main device 100 may perform operations S2055 and S2060.

The sub-device 200 may acquire the response information corresponding to the user voice from the selected device based on the received identification information at operation S2061. The sub-device 200 may provide the acquired response information at operation S2065.

Figure 21:
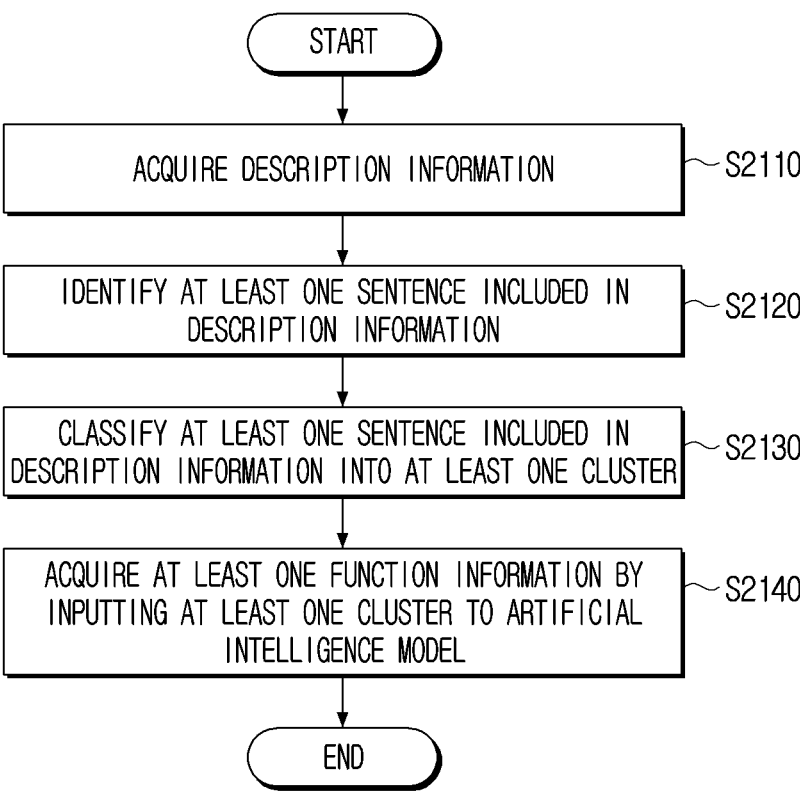
FIG. 21 is a flowchart for explaining an operation of acquiring the function information by using description information according to an embodiment of the disclosure.

FIG. 21 is a flowchart for explaining an operation of acquiring the function information by using the description information according to an embodiment of the disclosure.

Referring to FIG. 21, the main device 100 may acquire the description information of a newly connected device at operation S2110. The main device 100 may identify at least one sentence included in the description information at operation S2120. The main device 100 may classify at least one sentence included in the description information into at least one cluster at operation S2130. The main device 100 may acquire at least one function information by inputting at least one cluster to the artificial intelligence model at operation S2140.

FIG. 22 is a flowchart for explaining an operation of classifying a sentence included in the description information into a cluster according to an embodiment of the disclosure.

Operations S2210, S2220, and S2240 of FIG. 22 may correspond to the operations S2110, S2120, and S2140 of FIG. 21. Redundant descriptions thereof are thus omitted.

In case of identifying at least one sentence included in the description information, the main device 100 may classify at least one sentence included in the description information into the first type (or the beginning type) or the second type (or the inclusion type) at operation S2231.

In addition, the main device 100 may classify at least one sentence included in the description information into at least one cluster based on the determined type at operation S2232.

Figure 23:
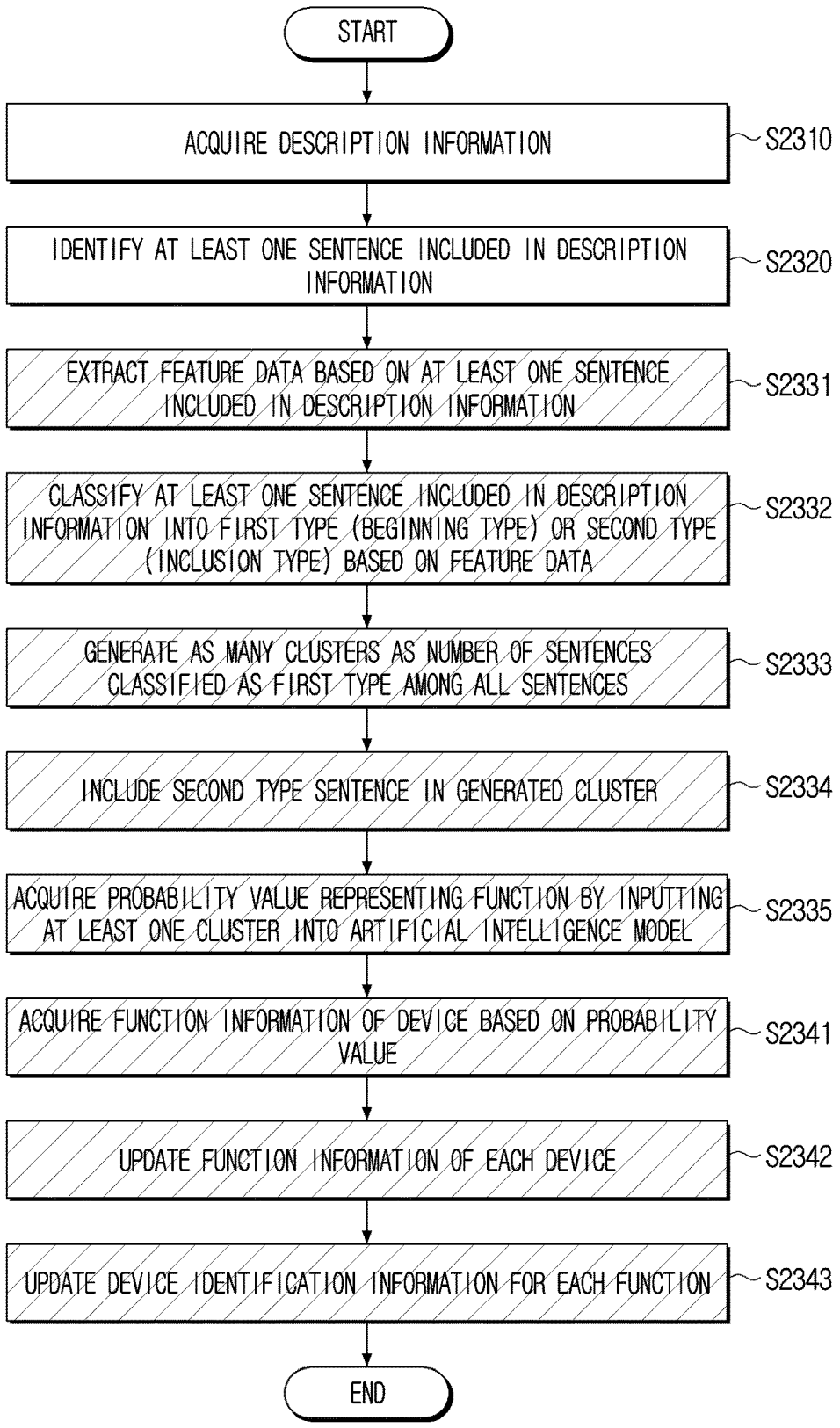
FIG. 23 is a flowchart for explaining a specific operation of acquiring the function information by using the description information according to an embodiment of the disclosure.

FIG. 23 is a flowchart for explaining a specific operation of acquiring the function information by using the description information according to an embodiment of the disclosure.

Operations S2310 and S2320 of FIG. 23 may correspond to the operations S2110 and S2120 of FIG. 21. Redundant descriptions thereof are thus omitted.

In case of identifying at least one sentence included in the description information, the main device 100 may extract the feature data based on the at least one sentence included in the description information at operation S2331.

The main device 100 may classify at least one sentence included in the description information into the first type (or the beginning type) or the second type (or the inclusion type) based on the feature data at operation S2332.

The main device 100 may generate as many clusters as the number of sentences classified as the first type among all the sentences included in the description information at operation S2333.

The main device 100 may include a second type sentence in the generated cluster at operation S2334.

The main device 100 may acquire the probability value representing the function by inputting at least one cluster into the artificial intelligence model at operation S2335.

The main device 100 may acquire the function information of the sub-device based on the probability value at operation S2341. The main device 100 may determine a function having a probability value of the threshold value or more or having the highest probability value as the function information of the device.

The main device 100 may update the function information of each device based on the function information at operation S2342. In addition, the main device 100 may update the device identification information for each function based on the function information at operation S2343.

Figure 24:
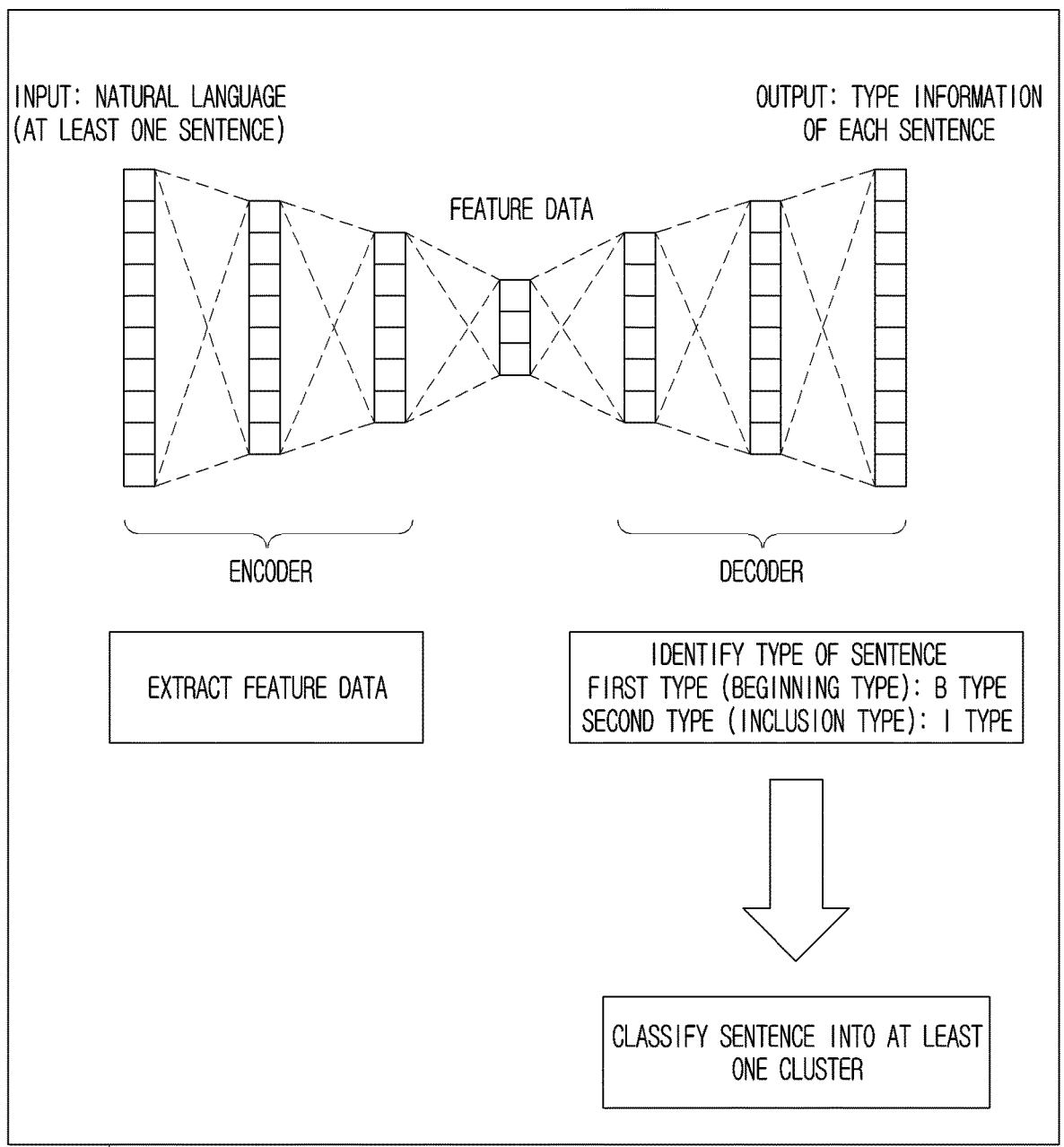
FIG. 24 is a view for explaining a module classifying a sentence included in the description information into a cluster according to an embodiment of the disclosure.

FIG. 24 is a view for explaining a module classifying a sentence included in the description information into a cluster according to an embodiment of the disclosure.

Referring to FIG. 24, reference numeral 2400 represents the artificial intelligence model determining a type of the sentence. The main device 100 may include the artificial intelligence model. The artificial intelligence model may receive a natural language as the input data. The artificial intelligence model may include the description information including the natural language as the input data. The description information may include at least one sentence. The artificial intelligence model may acquire each type of at least one sentence included in the description information, which is the input data, as the output data.

The artificial intelligence model may include the encoder and the decoder. The encoder may acquire the feature data based on the description information, which is the input data. The decoder may acquire type information of each sentence based on the feature data. The type information may include at least one of the first type (or the beginning type) or the second type (or the inclusion type). The first type may be described as a beginning (B) type. The second type may be described as an inclusion (I) type.

The artificial intelligence model may acquire the output data (or the type information of each sentence) based on the input data (or at least one sentence).

The main device 100 may classify at least one sentence into at least one cluster based on the type information of each sentence acquired based on the artificial intelligence model.

FIG. 25 is a view for explaining an operation of classifying a sentence included in the description information into a cluster according to an embodiment of the disclosure.

Referring to FIG. 25, the main device 100 may classify the plurality of sentences included in the description information into at least one cluster.

Reference numeral 2510 shows that the description information includes four sentences. It may be assumed that the description information includes a first sentence, a second sentence, a third sentence, and a fourth sentence.

Reference numeral 2520 shows type information of each of the four sentences. The description describes an operation of acquiring the type information with reference to FIG. 24.

A criterion for determining the type information may be whether information on a new function is described. The first sentence may be a first sentence in the sentences, and the main device 100 may thus determine the first sentence as the first type (or the beginning type). The main device 100 may determine that a function included in the first sentence is the dust removal function.

The main device 100 may identify a function included in the second sentence. In case that the function described in the second sentence is the same as the function described in the first sentence, the main device 100 may determine the second sentence as the second type (or the inclusion type).

The main device 100 may identify a function included in the third sentence. It may be assumed that the function described in the third sentence is the deodorization function. In case that the function described in the third sentence is different from the function described in the second sentence, the main device 100 may determine the third sentence as the first type (or the beginning type).

The main device 100 may identify a function included in the fourth sentence. It may be assumed that the function described in the fourth sentence is the sterilization function. The function described in the fourth sentence is different from the function described in the third sentence, and the main device 100 may thus determine the fourth sentence as the first type (or the beginning type).

The main device 100 may determine the type information of a current sentence based on whether function described in a previous sentence is the same as a function described in the current sentence.

Reference numeral 2530 shows that the four sentences are classified into at least one cluster. A cluster may represent a group unit based on a predetermined criterion. The predetermined criterion may be a function, and the clusters may be classified based on the function. The main device 100 may classify the clusters based on the type information.

The main device 100 may classify a sentence determined as the first type into a separate cluster. The main device 100 may include a sentence determined as the second type in the cluster allocated to the previous sentence.

For example, the main device 100 may allocate the first sentence to the first cluster, allocate the third sentence to the second cluster, and allocate the fourth sentence to the third cluster. In addition, the main device 100 may include the second sentence in the first cluster.

FIG. 26 is a view for explaining an operation of acquiring the function information based on the cluster according to an embodiment of the disclosure.

Referring to FIG. 26, reference numeral 2630 may correspond to the reference numeral 2530 of FIG. 25. Redundant descriptions thereof are thus omitted.

The main device 100 may input at least one sentence (or the description information) classified into the plurality of clusters into the artificial intelligence model. The artificial intelligence model described with reference to FIG. 26 may perform a different operation from the artificial intelligence model described with reference to FIG. 24. For classification, the artificial intelligence model of FIG. 24 may be described as the first artificial intelligence model, and the artificial intelligence model of FIG. 26 may be described as the second artificial intelligence model.

The main device 100 may input the description information classified into the plurality of clusters to the second artificial intelligence model as the input data, and acquire a probability value 2640 of the function corresponding to each cluster.

Each cluster may be classified into a specific function (or a representative function). For example, the first cluster may represent the dust removal function, the second cluster may represent the deodorization function, and the third cluster may represent the sterilization function.

The main device 100 may acquire the probability value 2640 of each function included in the description information as the output data by using the second artificial intelligence model. For example, the main device 100 may acquire the output data having 0.9 as a probability of representing the dust removal function, 0.8 as a probability of representing the deodorization function, and 0.9 as a probability of representing the sterilization function, based on the sentence included in the description information.

According to various embodiments of the disclosure, it is possible to implement one artificial intelligence model including the first artificial intelligence model and the second artificial intelligence model. The main device 100 may acquire the type information and the probability value through one artificial intelligence model.

Figure 27:
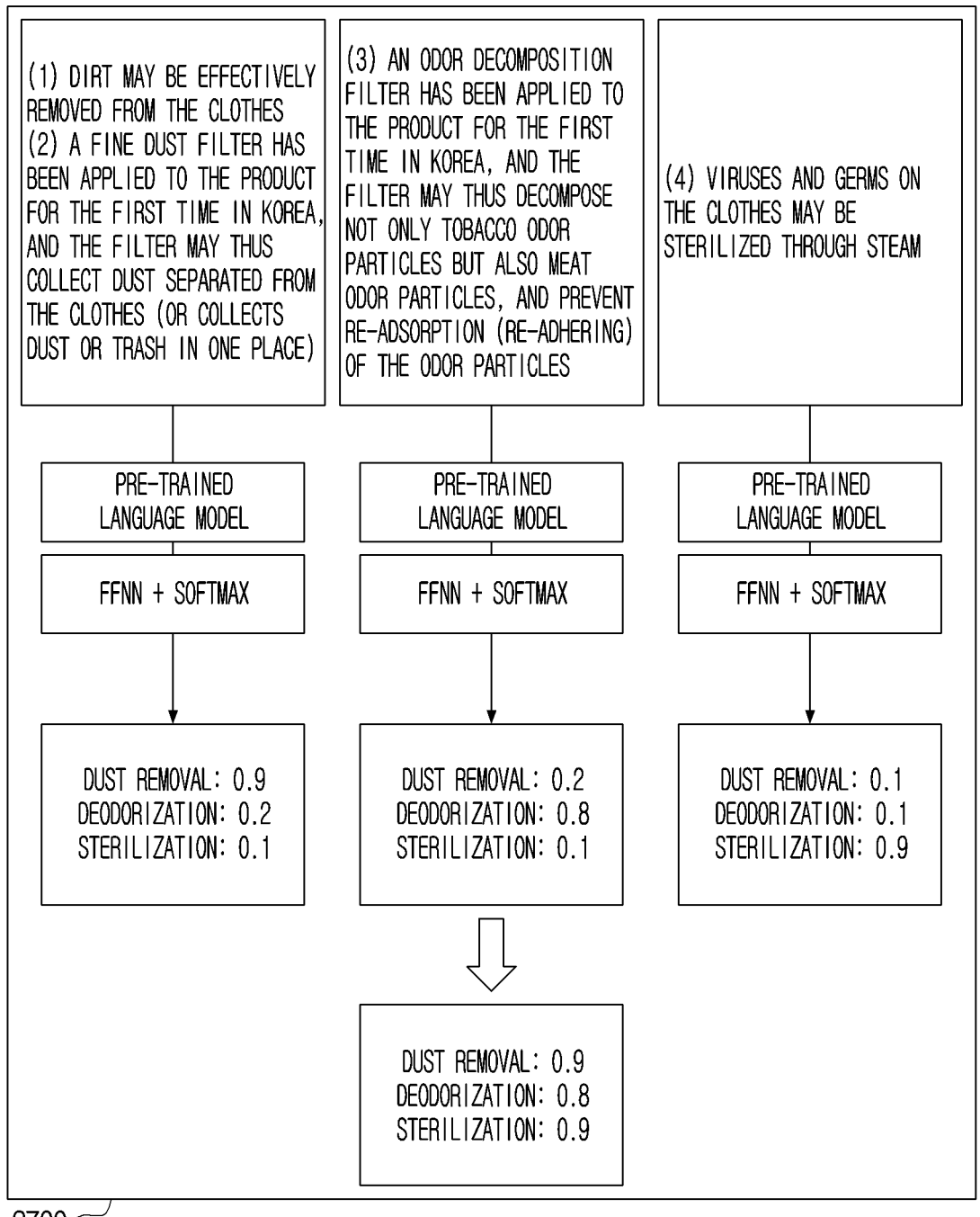
FIG. 27 is a view for explaining a specific operation of acquiring the function information based on the cluster according to an embodiment of the disclosure.

FIG. 27 is a view for explaining a specific operation of acquiring the function information based on the cluster according to an embodiment of the disclosure.

Referring to FIG. 27, the view 2700 shows a process of acquiring the probability value 2640 described with reference to FIG. 26.

The main device 100 may input a sentence included in the first cluster to the pre-trained language model. In addition, the main device 100 may input the output data of the pre-trained language model to the feed forward neural network (FFNN) and the softmax. The main device 100 may identify a plurality of candidate functions (or the dust removal function, the deodorization function, and the sterilization function) of the sentence included in the first cluster based on the FFNN and the soft max. The main device 100 may acquire respective probability values 0.9, 0.2, and 0.1 of the plurality of candidate functions. The main device 100 may determine a candidate function (or the dust removal function) having the highest probability value among the respective probability values of the plurality of candidate functions as the representative function corresponding to the first cluster.

The main device 100 may apply the sentence included in the second cluster to the pre-trained language model, the FFNN, and the soft max, as the same as the sentence included in the first cluster. The main device 100 may identify the plurality of candidate functions (or the dust removal function, the deodorization function, and the sterilization function) of the sentence included in the second cluster. The main device 100 may acquire respective probability values 0.2, 0.8, and 0.1 of the plurality of candidate functions. The main device 100 may determine the candidate function (or the deodorization function) having the highest probability value among the respective probability values of the plurality of candidate functions as the representative function corresponding to the second cluster.

The main device 100 may apply the sentence included in the third cluster to the pre-trained language model, the FFNN, and the soft max, as the same as the sentence included in the first cluster. The main device 100 may identify the plurality of candidate functions (or the dust removal function, the deodorization function, and the sterilization function) of the sentence included in the third cluster. The main device 100 may acquire respective probability values 0.1, 0.1, and 0.9 of the plurality of candidate functions. The main device 100 may determine the candidate function (or the sterilization function) having the highest probability value among the respective probability values of the plurality of candidate functions as the representative function corresponding to the third cluster.

The main device 100 may acquire the function information including the representative function of each cluster. The main device 100 may acquire the function information corresponding to the description information. The function information may be described as the function information corresponding to the sub-device 200 in that the acquired function information is acquired based on the description information indicating the sub-device 200.

Figure 28:
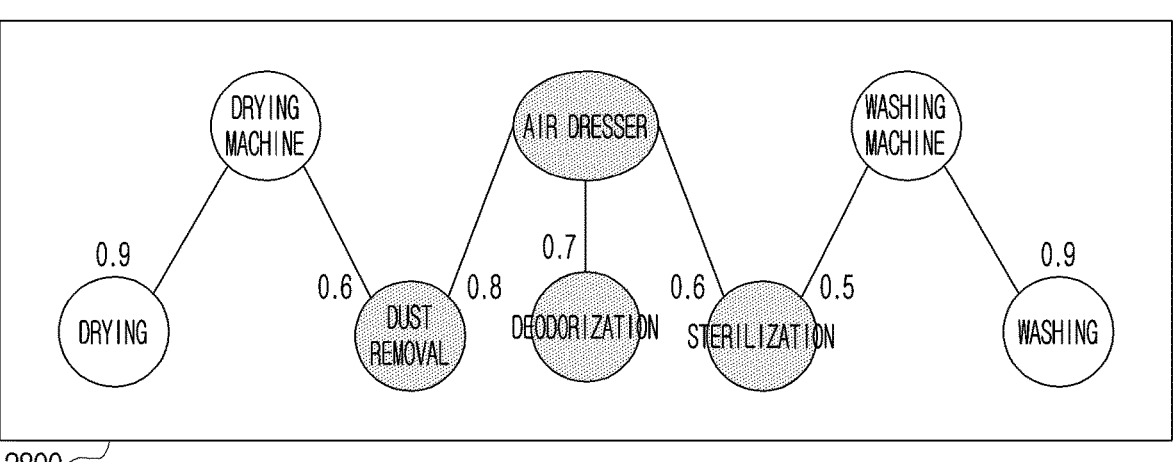
FIG. 28 is a view for explaining importance between a device and a function according to an embodiment of the disclosure.

FIG. 28 is a view for explaining a probability value between a device and a function according to an embodiment of the disclosure.

Referring to FIG. 28, the view 2800 may show the importance of the plurality of functions. The view 2800 is described with reference to FIGS. 15 and 16.

The drying machine may perform the drying function and the dust removal function. The air dresser may perform the dust removal function, the deodorization function, and the sterilization function. The washing machine may perform the sterilization function and the washing function.

The drying machine and the air dresser may perform the dust removal function. The dust removal function may have different importance based on the device. The drying machine may have 0.6 as the importance of the dust removal function, and the air dresser may have 0.8 as the importance of the dust removal function. The higher the importance, the more important function of the device.

The air dresser and the washing machine may perform the sterilization function. The sterilization function may have different importance based on the device. The air dresser may have 0.6 as the importance of the sterilization function, and the washing machine may have 0.5 as the importance of the sterilization function.

Figure 29:
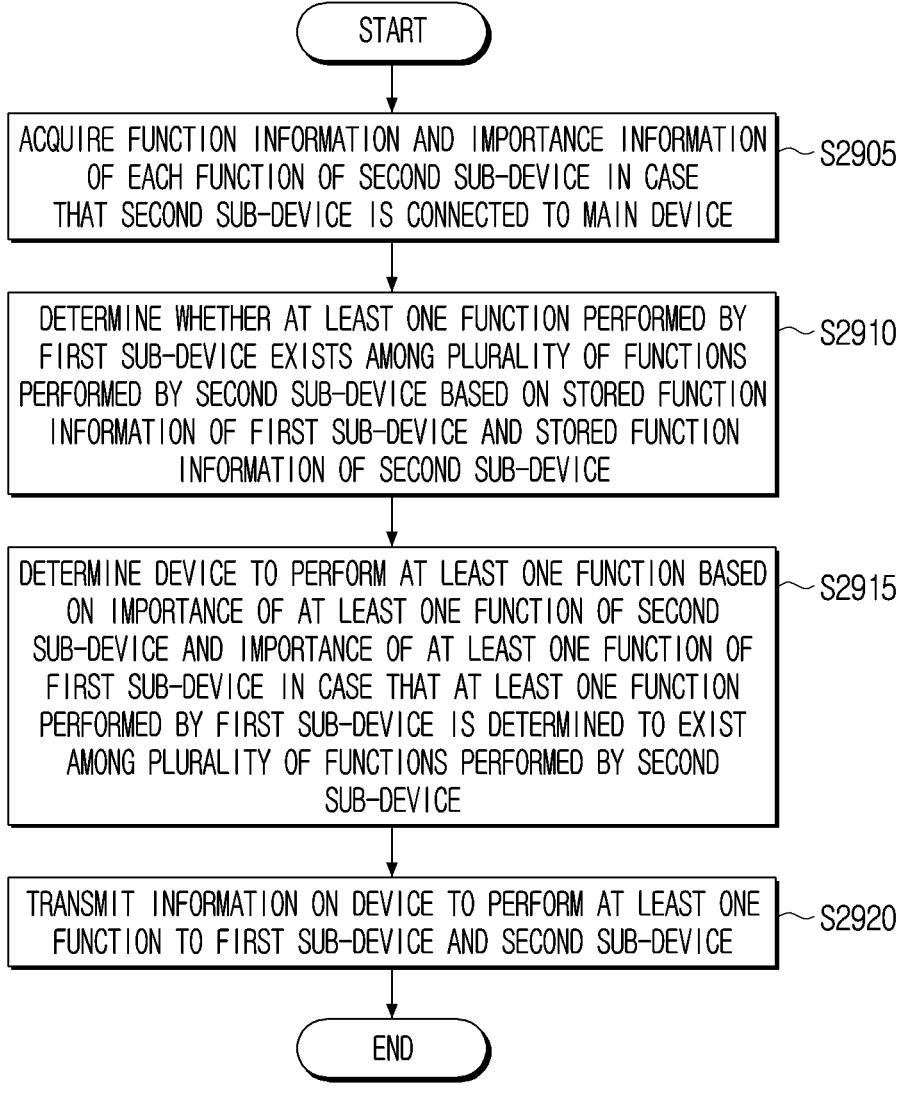
FIG. 29 is a flowchart for explaining a controlling method of a main device according to an embodiment of the disclosure.

FIG. 29 is a flowchart for explaining a controlling method of a main device 100 according to an embodiment of the disclosure.

Referring to FIG. 29, a controlling method of a main device which stores the function information and importance information of each function of a first sub-device, and is connected to the first sub-device may include: acquiring the function information and importance information of each function of a second sub-device in case that the second sub-device is connected to the main device at operation S2905; determining whether at least one function performed by the first sub-device exists among a plurality of functions performed by the second sub-device based on the stored function information of the first sub-device and the stored function information of the second sub-device at operation S2910; determining a device to perform at least one function based on importance of at least one function of the second sub-device and importance of at least one function of the first sub-device in case that at least one function performed by the first sub-device is determined to exist among the plurality of functions performed by the second sub-device at operation S2915; and transmitting information on the device to perform at least one function to the first sub-device and the second sub-device at operation S2920, wherein in case that the device to perform at least one function is determined as the second sub-device, the first sub-device reallocates a voice recognition segmentation model stored in the first sub-device for each function based on information on a remaining function except for at least one function among the plurality of functions performed by the first sub-device and a resource of the first sub-device.

In case that the device to perform at least one function is determined as the second sub-device, the second sub-device may allocate a voice recognition segmentation model stored in the second sub-device for each function based on information on at least one function including at least one function among the plurality of functions performed by the second sub-device and a resource of the second sub-device.

In the determining at operation S2915, the target device to perform at least one function may be determined, and in the transmitting at operation S2920, result information including information indicating that at least one function is performed by the target device may be transmitted to the first sub-device and the second sub-device.

In the determining at operation S2915, the device to perform each of the plurality of functions may be determined based on the importance of the plurality of functions of the second device and the importance of the plurality of functions of the first device in case that the plurality of functions performed by the first sub-device are determined to exist among the plurality of functions performed by the second sub-device.

In the determining at operation S2915, a device to perform a first function among the plurality of functions may be determined as the first sub-device 210, and a device to perform a second function among the plurality of functions may be determined as the second sub-device 220, and in the transmitting at operation S2920, the result information including information indicating that the first function is performed by the first sub-device and information indicating that the second function is performed by the second sub-device may be transmitted to the first sub-device and the second sub-device.

In the acquiring at operation S2905, description information of the second sub-device may be acquired in case that the second sub-device is connected to the main device, and the function information and importance information of each function of the second sub-device 220 may be acquired based on the description information of the second sub-device 220.

In the acquiring at operation S2905, a main function and an auxiliary function may be identified based on the description information of the second sub-device 220, and importance of the main function and importance of the auxiliary function may be acquired, the importance of the main function having a larger value than the importance of the auxiliary function.

In the acquiring at operation S2905, the function information and importance information of each function of the second sub-device 220 may be acquired by analyzing at least one sentence included in the description information of the second sub-device.

In the acquiring at operation S2905, the description information of the second sub-device 220 among the plurality of description information stored in the main device may be acquired in case that the second sub-device 220 is connected to the main device 100.

In the acquiring at operation S2905, a request for description information of the second sub-device may be transmitted to an external server in case that the description information of the second sub-device is not identified among the plurality of description information stored in the main device, and description information of the second sub-device may be acquired from the external server.

The controlling method of the main device 100 as shown in FIG. 29 may be performed by the main device 100 having the configuration of FIG. 1 or 2, and may also be performed by the main device 100 having another configuration.

The methods according to various embodiments of the disclosure described above may be implemented in the form of an application which may be installed in an electronic apparatus (or the main device 100).

In addition, the methods according to the various embodiments of the disclosure described above may be implemented only by software upgrade or hardware upgrade of the conventional electronic apparatus.

In addition, various embodiments of the disclosure described above may be performed through an embedded server included in the electronic apparatus, or an external server of at least one of the electronic apparatus or the display device.

According to the various embodiments of the disclosure, the various embodiments described above may be implemented in software including an instruction stored in a machine-readable storage medium (for example, a computer-readable storage medium). A machine may be a device that invokes the stored instruction from a storage medium, may be operated based on the invoked instruction, and may include the electronic apparatus according to the disclosed embodiments. In case that the instruction is executed by the processor, the processor may directly perform a function corresponding to the instruction, or other components may perform the function corresponding to the instruction under a control of the processor. The instruction may include codes generated or executed by a compiler or an interpreter. The machine-readable storage medium may be provided in the form of a non-transitory storage medium. Here, the term "non-transitory" indicates that the storage medium is tangible without including a signal, and does not distinguish whether data are semi-permanently or temporarily stored in the storage medium.

In addition, according to one or more embodiments of the disclosure, the methods according to the various embodiments described above may be included and provided in a computer program product. The computer program product may be traded as a product between a seller and a purchaser. The computer program product may be distributed in a form of the machine-readable storage medium (for example, a compact disc read only memory (CD-ROM)), or may be distributed online through an application store (for example, PlayStore™). In case of the online distribution, at least a part of the computer program product may be at least temporarily stored or temporarily provided in a storage medium such as a memory of a server of a manufacturer, a server of an application store or a relay server.

In addition, each component (e.g., module or program) in the various embodiments described above may include a single entity or a plurality of entities, and some of the corresponding sub-components described above may be omitted or other sub-components may be further included in the various embodiments. Alternatively or additionally, some of the components (e.g., modules or programs) may be integrated into one entity, and may perform functions performed by the respective corresponding components before being integrated in the same or similar manner. Operations performed by the modules, the programs, or other components according to the various embodiments may be executed in a sequential manner, a parallel manner, an iterative manner, or a heuristic manner, at least some of the operations may be performed in a different order or be omitted, or other operations may be added.

While the disclosure has been shown and described with reference to various embodiments thereof, it will be understood by those skilled in the art that various changes in form and details may be made therein without departing from the scope and spirit of the disclosure as defined by the appended claims and their equivalents.

What is claimed is:

1. A main device comprising:
memory configured to store function information and importance information of each function of a first sub-device;
a communication interface connected to the first sub-device; and
at least one processor configured to:
establish a connection to a second sub-device,
acquire function information and importance information of each function of the second sub-device,
determine whether at least one function performed by the first sub-device exists among a plurality of functions performed by the second sub-device based on the stored function information of the first sub-device and the acquired function information of the second sub-device,
in response to determining that the at least one function performed by the first sub-device exists among the plurality of functions performed by the second sub-device, determine a device to perform the at least one function based on importance of the at least one function of the second sub-device and importance of the at least one function of the first sub-device, and
transmit information on the device to perform the at least one function to the first sub-device and the second sub-device through the communication interface,
wherein, in response to the device to perform the at least one function being determined as the second sub-device, the first sub-device reallocates a voice recognition segmentation model stored in the first sub-device for each function based on information on a remaining function except for the at least one function among the plurality of functions performed by the first sub-device and a resource of the first sub-device.

2. The device as claimed in claim 1, wherein, in response to the device to perform the at least one function being determined as the second sub-device, the second sub-device allocates a voice recognition segmentation model stored in the second sub-device for each function based on information on at least one function including the at least one function among the plurality of functions performed by the second sub-device and a resource of the second sub-device.

3. The device as claimed in claim 1, wherein the at least one processor is further configured to:
    determine a target device to perform the at least one function, and
    transmit result information including information indicating that at least one function is performed by the target device to the first sub-device and the second sub-device through the communication interface.

4. The device as claimed in claim 1, wherein the at least one processor is further configured to determine the device to perform each of the plurality of functions based on the importance of the plurality of functions of the second sub-device and the importance of the plurality of functions of the first sub-device in response to determining that the plurality of functions performed by the first sub-device exist among the plurality of functions performed by the second sub-device.

5. The device as claimed in claim 4, wherein the at least one processor is further configured to:
    determine a device to perform a first function among the plurality of functions as the first sub-device,
    determine a device to perform a second function among the plurality of functions as the second sub-device, and
    transmit result information including information indicating that the first function is performed by the first sub-device and information indicating that the second function is performed by the second sub-device to the first sub-device and the second sub-device through the communication interface.

6. The device as claimed in claim 1, wherein the at least one processor is further configured to:
    acquire description information of the second sub-device, and
    acquire the function information and importance information of each function of the second sub-device based on the description information of the second sub-device.

7. The device as claimed in claim 6, wherein the at least one processor is further configured to:
    identify a main function and an auxiliary function based on the description information of the second sub-device, and
    acquire an importance of the main function and an importance of the auxiliary function,
    wherein the importance of the main function having a larger value than the importance of the auxiliary function.

8. The device as claimed in claim 6, wherein the at least one processor is further configured to acquire the function information and importance information of each function of the second sub-device by analyzing at least one sentence included in the description information of the second sub-device.

9. The device as claimed in claim 6, wherein the at least one processor is further configured to acquire the description information of the second sub-device among the description information stored in the memory.

10. The device as claimed in claim 6, wherein the at least one processor is further configured to:
    request the description information of the second sub-device from an external server through the communication interface in response to the description information of the second sub-device not being identified among the description information stored in the memory, and receive the description information of the second sub-device from the external server through the communication interface.

11. A method performed by a main device which stores function information and importance information of each function of a first sub-device, and is connected to the first sub-device, the method comprising:
    establishing, by the main device, a connection with a second sub-device,
    acquiring, by the main device, function information and importance information of each function of a second sub-device;
    determining, by the main device, whether at least one function performed by the first sub-device exists among a plurality of functions performed by the second sub-device based on the stored function information of the first sub-device and the acquired function information of the second sub-device;
    in response to determining that the at least one function performed by the first sub-device exists among the plurality of functions performed by the second sub-device, determining, by the main device, a device to perform the at least one function based on importance of the at least one function of the second sub-device and the importance of the at least one function of the first sub-device; and
    transmitting information on the device to perform the at least one function to the first sub-device and the second sub-device,
    wherein, in response to the device to perform the at least one function being determined as the second sub-device, the first sub-device reallocates a voice recognition segmentation model stored in the first sub-device for each function based on information on a remaining function except for the at least one function among the plurality of functions performed by the first sub-device and a resource of the first sub-device.

12. The method as claimed in claim 11, wherein, in response to the device to perform the at least one function being determined as the second sub-device, the second sub-device allocates a voice recognition segmentation model stored in the second sub-device for each function based on information on at least one function including the at least one function among the plurality of functions performed by the second sub-device and a resource of the second sub-device.

13. The method as claimed in claim 11,
    wherein the determining of the device comprises determining a target device to perform the at least one function, and
    wherein the transmitting of the information on the device to perform the at least one function comprises transmitting result information including information indicating that at least one function is performed by the target device to the first sub-device and the second sub-device.

14. The method as claimed in claim 11, wherein in the determining of the device comprises determining the device to perform each of the plurality of functions based on the importance of the plurality of functions of the second sub-device and the importance of the plurality of functions of the first sub-device in response to determining that the plurality of functions performed by the first sub-device exist among the plurality of functions performed by the second sub-device.

15. The method as claimed in claim 14,
    wherein the determining of the device further comprises:

determining a device to perform a first function among the plurality of functions as the first sub-device, and determining a device to perform a second function among the plurality of functions as the second sub-device, and wherein the transmitting of the information on the device to perform the at least one function comprises transmitting result information including information indicating that the first function is performed by the first sub-device and information indicating that the second function is performed by the second sub-device to the first sub-device and the second sub-device.

16. The method as claimed in claim 11, wherein the acquiring of the function information and the importance information comprises:

acquiring description information of the second sub-device; and acquiring the function information and the importance information of each function of the second sub-device based on the description information of the second sub-device.

17. The method as claimed in claim 11, further comprising:

storing the importance information and the function information of each function of the first sub-device in a memory of the main device.

18. The method as claimed in claim 11, wherein the determining of whether the at least one function performed by the first sub-device exists comprises:

determining whether at least one function performed by the first sub-device corresponds to at least one of the plurality of functions performed by the second sub-device.

* * * * *